United States Patent
Snyder

(10) Patent No.: US 10,948,577 B2
(45) Date of Patent: Mar. 16, 2021

(54) SYSTEMS AND ASSOCIATED METHODS FOR GENERATING A FISH ACTIVITY REPORT BASED ON AGGREGATED MARINE DATA

(71) Applicant: NAVICO HOLDING AS, Egersund (NO)

(72) Inventor: Kristopher C. Snyder, Claremore, OK (US)

(73) Assignee: NAVICO HOLDING AS, Egersund (NO)

( * ) Notice: Subject to any disclaimer, the term of this patent is extended or adjusted under 35 U.S.C. 154(b) by 139 days.

(21) Appl. No.: 15/246,929

(22) Filed: Aug. 25, 2016

(65) Prior Publication Data
US 2018/0059230 A1    Mar. 1, 2018

(51) Int. Cl.
*G06K 17/00* (2006.01)
*G01S 7/62* (2006.01)
(Continued)

(52) U.S. Cl.
CPC .......... *G01S 7/6281* (2013.01); *G01S 7/003* (2013.01); *G01S 7/6263* (2013.01);
(Continued)

(58) Field of Classification Search
None
See application file for complete search history.

(56) References Cited

U.S. PATENT DOCUMENTS

| 4,445,178 A | 4/1984 | Scheer et al. |
| 4,829,493 A | 5/1989 | Bailey |

(Continued)

FOREIGN PATENT DOCUMENTS

| DE | 102004059619 | 6/2006 |
| EP | 1 561 377 | 8/2005 |

(Continued)

OTHER PUBLICATIONS

PCT International Search Report and Written Opinion; PCT/IB2014/063979; dated Jan. 7, 2015.
(Continued)

*Primary Examiner* — Hovhannes Baghdasaryan
(74) *Attorney, Agent, or Firm* — Nelson Mullins Riley & Scarborough LLP

(57) ABSTRACT

A computing device is configured to receive a plurality of sets of sonar data, current locations associated with the sonar data, and condition parameters associated with the plurality of sets of sonar data from one or more marine electronic devices. The computing device receives a request from a user to display a condition and location based fishing activity s report. The request indicating a location and a condition parameter associated with desired fishing activity. The computing device filters the plurality of sets of the sonar data based on the request to generate a fishing activity report including one or more portions of the plurality of sets of the sonar data that are associated with the indicated location and the condition parameter and causes display of the fishing activity report on a screen such that the one or more portions of the plurality of sets of the sonar data are displayed.

18 Claims, 14 Drawing Sheets

(51) Int. Cl.
  *G01S 15/96* (2006.01)
  *G01S 7/00* (2006.01)
  *G01S 15/89* (2006.01)
  *G01S 15/86* (2020.01)

(52) U.S. Cl.
  CPC ............ *G01S 7/6272* (2013.01); *G01S 15/86* (2020.01); *G01S 15/89* (2013.01); *G01S 15/96* (2013.01); *G06K 17/00* (2013.01)

(56) References Cited

U.S. PATENT DOCUMENTS

| | | |
|---|---|---|
| 4,879,697 A | 11/1989 | Lowrance et al. |
| 5,025,423 A | 6/1991 | Earp |
| 5,191,341 A | 3/1993 | Gouard et al. |
| 5,321,391 A | 6/1994 | Fox |
| 5,446,775 A | 8/1995 | Wright et al. |
| 5,537,380 A | 7/1996 | Sprankle, Jr. et al. |
| 5,546,695 A | 8/1996 | Langer |
| 6,222,449 B1 | 4/2001 | Twining |
| 6,225,984 B1 | 5/2001 | Crawford |
| 6,252,544 B1 | 6/2001 | Hoffberg |
| 6,263,147 B1 | 7/2001 | Tognazzini |
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,459,372 B1 | 10/2002 | Branham et al. |
| 6,567,792 B1 | 5/2003 | Arnold |
| 6,584,722 B1 | 7/2003 | Walls et al. |
| 6,587,740 B2 | 7/2003 | Byrne et al. |
| 6,751,626 B2 | 6/2004 | Brown et al. |
| 6,761,692 B2 | 7/2004 | Angelsen et al. |
| 6,798,378 B1 | 9/2004 | Walters |
| 6,816,782 B1 | 11/2004 | Walters et al. |
| 7,002,579 B2 | 2/2006 | Olson |
| 7,200,488 B2 | 4/2007 | Taboada |
| 7,236,426 B2 | 6/2007 | Turner et al. |
| 7,243,457 B1 | 7/2007 | Smith et al. |
| 7,248,159 B2 | 7/2007 | Smith |
| 7,254,483 B2 | 8/2007 | Squires et al. |
| 7,321,824 B1 | 1/2008 | Nesbitt |
| 7,430,461 B1 | 9/2008 | Michaels |
| 7,652,952 B2 | 1/2010 | Betts et al. |
| 7,710,825 B2 | 5/2010 | Betts et al. |
| 7,722,218 B2 | 5/2010 | Leung |
| 7,729,203 B2 | 6/2010 | Betts et al. |
| 7,755,974 B2 | 7/2010 | Betts et al. |
| 7,812,667 B2 | 10/2010 | Fagg |
| 7,870,496 B1 | 1/2011 | Sherwani |
| 7,877,502 B2 | 1/2011 | Rensin et al. |
| 7,890,867 B1 | 2/2011 | Margulis |
| 8,019,532 B2 | 9/2011 | Sheha et al. |
| 8,040,758 B1 | 10/2011 | Dickinson |
| 8,063,540 B2 | 11/2011 | Angelsen et al. |
| 8,082,100 B2 | 12/2011 | Grace et al. |
| 8,447,332 B2 | 5/2013 | Weinreich et al. |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,775,669 B2 | 7/2014 | Hutchinson |
| 8,831,868 B2 | 9/2014 | Grace et al. |
| 8,838,536 B2 | 9/2014 | Bhanote |
| 9,104,697 B2 | 8/2015 | Lauenstein et al. |
| 9,162,743 B2 | 10/2015 | Grace et al. |
| 9,200,882 B2 | 12/2015 | Lauenstein et al. |
| 9,213,722 B2 | 12/2015 | Lauenstein et al. |
| 9,266,589 B2 | 2/2016 | Grace et al. |
| 9,361,314 B2 | 6/2016 | Lauenstein et al. |
| 9,367,565 B2 | 6/2016 | Lauenstein et al. |
| 9,430,497 B2 | 8/2016 | Lauenstein et al. |
| 2001/0054961 A1 | 12/2001 | Twining |
| 2002/0035574 A1 | 3/2002 | Dumas |
| 2002/0093541 A1 | 7/2002 | Schileru-Key |
| 2002/0099457 A1 | 7/2002 | Fredlund et al. |
| 2003/0056419 A1 | 3/2003 | Squires |
| 2003/0089020 A1 | 5/2003 | Dirito |
| 2004/0124297 A1 | 7/2004 | Steer |
| 2004/0193364 A1 | 9/2004 | Chojnacki |
| 2004/0249860 A1* | 12/2004 | Stechschulte .......... A01K 97/00 |
| 2005/0037872 A1 | 2/2005 | Fredlund et al. |
| 2005/0102101 A1 | 5/2005 | Beesley et al. |
| 2006/0013066 A1 | 1/2006 | Nishimori et al. |
| 2006/0048434 A1 | 3/2006 | Congel |
| 2006/0119585 A1 | 6/2006 | Skinner |
| 2006/0224940 A1 | 10/2006 | Lee |
| 2006/0265931 A1 | 11/2006 | McFadden et al. |
| 2007/0011334 A1 | 1/2007 | Higgins et al. |
| 2007/0045010 A1 | 3/2007 | Kasperek |
| 2007/0058489 A1 | 3/2007 | Bratcher |
| 2007/0220798 A1 | 9/2007 | Davidson |
| 2008/0126935 A1 | 5/2008 | Blomgren |
| 2008/0165022 A1 | 7/2008 | Herz et al. |
| 2008/0195313 A1* | 8/2008 | Coleman ............ G01C 21/3484 701/414 |
| 2008/0204424 A1 | 8/2008 | Jin et al. |
| 2008/0246627 A1 | 10/2008 | Guazzelli |
| 2009/0064055 A1 | 3/2009 | Chaudhri et al. |
| 2009/0099871 A1 | 4/2009 | Gadodia |
| 2009/0105952 A1 | 4/2009 | Grace et al. |
| 2009/0179789 A1 | 7/2009 | Haughay, Jr. et al. |
| 2009/0240354 A1 | 9/2009 | Davidson |
| 2009/0249247 A1 | 10/2009 | Tseng et al. |
| 2009/0258710 A1 | 10/2009 | Quatrochi |
| 2009/0271054 A1 | 10/2009 | Dokken |
| 2009/0287409 A1 | 11/2009 | Summers |
| 2009/0295626 A1 | 12/2009 | Su |
| 2010/0049468 A1 | 2/2010 | Papadourakis |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0007035 A1 | 1/2011 | Shai |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0082644 A1 | 4/2011 | Imasaka et al. |
| 2011/0154183 A1 | 6/2011 | Burns et al. |
| 2011/0208479 A1 | 8/2011 | Chaves |
| 2011/0213515 A1 | 9/2011 | Haymart et al. |
| 2011/0214500 A1 | 9/2011 | Cabrera et al. |
| 2011/0257819 A1 | 10/2011 | Chen et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0047790 A1 | 3/2012 | Hess et al. |
| 2012/0069712 A1 | 3/2012 | Potanin et al. |
| 2012/0106300 A1 | 5/2012 | Maguire |
| 2012/0144384 A1 | 6/2012 | Baek |
| 2012/0144723 A1 | 6/2012 | Davidson |
| 2012/0185801 A1 | 7/2012 | Madonna et al. |
| 2012/0316456 A1 | 12/2012 | Rahman et al. |
| 2012/0317167 A1 | 12/2012 | Rahman et al. |
| 2013/0007665 A1 | 1/2013 | Chaudhri et al. |
| 2013/0040714 A1 | 2/2013 | Rosing |
| 2013/0074051 A1 | 3/2013 | Freeman |
| 2013/0096575 A1 | 4/2013 | Olson |
| 2013/0107031 A1 | 5/2013 | Atkinson |
| 2013/0307720 A1 | 11/2013 | Lilburn |
| 2013/0343151 A1 | 12/2013 | Shiraki et al. |
| 2014/0012587 A1 | 1/2014 | Park |
| 2014/0032468 A1 | 1/2014 | Anandaraj |
| 2014/0071059 A1 | 3/2014 | Girault |
| 2014/0111368 A1 | 4/2014 | Lee et al. |
| 2014/0164375 A1 | 6/2014 | Persson et al. |
| 2014/0180566 A1 | 6/2014 | Malhotra |
| 2014/0195297 A1 | 7/2014 | Abuelsaad et al. |
| 2014/0358483 A1 | 12/2014 | da Rosa |
| 2015/0019135 A1 | 1/2015 | Kacyvenski |
| 2015/0051786 A1 | 2/2015 | Wang |

(56) References Cited

U.S. PATENT DOCUMENTS

| | | | |
|---|---|---|---|
| 2015/0054655 | A1 | 2/2015 | Bailey |
| 2015/0054732 | A1 | 2/2015 | Bailey |
| 2015/0054828 | A1 | 2/2015 | Bailey |
| 2015/0054829 | A1 | 2/2015 | Bailey |
| 2015/0055827 | A1 | 2/2015 | Bailey |
| 2015/0055930 | A1 | 2/2015 | Bailey |
| 2015/0057929 | A1 | 2/2015 | Bailey |
| 2015/0057965 | A1 | 2/2015 | Gaynor |
| 2015/0057968 | A1 | 2/2015 | Bailey |
| 2015/0058020 | A1 | 2/2015 | Bailey |
| 2015/0058237 | A1 | 2/2015 | Bailey |
| 2015/0058323 | A1 | 2/2015 | Bailey |
| 2015/0310524 | A1 | 10/2015 | Gospodarek et al. |
| 2015/0346729 | A1 | 12/2015 | Grace et al. |
| 2016/0098865 | A1 | 4/2016 | Grace et al. |
| 2016/0098866 | A1 | 4/2016 | Grace et al. |
| 2016/0098867 | A1 | 4/2016 | Grace et al. |
| 2016/0101841 | A1 | 4/2016 | Grace et al. |
| 2016/0125348 | A1 | 5/2016 | Dyer et al. |
| 2016/0146936 | A1* | 5/2016 | Konig ............... G01S 15/96 367/99 |

FOREIGN PATENT DOCUMENTS

| | | |
|---|---|---|
| EP | 2 613 223 | 7/2013 |
| GB | 2465162 | 5/2010 |
| JP | 2004-207812 | 7/2004 |
| JP | 2006-158239 | 6/2006 |
| JP | 2010-193284 | 9/2010 |
| JP | 2011-139647 | 7/2011 |
| WO | WO 1998/02037 | 1/1998 |
| WO | WO 2004/088572 | 10/2004 |
| WO | WO 2010/056392 | 5/2010 |
| WO | WO 2012/170163 | 12/2012 |
| WO | WO 2014/088508 | 6/2014 |
| ZA | 2003-08052 | 7/2004 |

OTHER PUBLICATIONS

PCT International Search Report and Written Opinion; PCT/IB2014/063980; dated Jan. 5, 2015.
PCT International Search Report and Written Opinion; PCT/IB2014/063982; dated Dec. 22, 2014.
PCT International Search Report and Written Opinion; PCT/IB2014/063975; dated Dec. 3, 2014.
PCT International Search Report and Written Opinion; PCT/IB2014/063974; dated Dec. 2, 2014.
PCT International Search Report and Written Opinion; PCT/IB2013/060285, dated Feb. 18, 2014.
PCT International Search Report and Written Opinion; PCT/IB2014/063976; dated Dec. 12, 2014.
PCT International Search Report and Written Opinion; PCT/IB2014/063983; dated Mar. 5, 2015.
PCT International Search Report and Written Opinion; PCT/US2013/047645; dated Sep. 27, 2013.
PCT International Search Report and Written Opinion; PCT/US2013/047869; dated Oct. 21, 2013.
PCT International Search Report and Written Opinion; PCT/US2013/047926; dated Oct. 11, 2013.
PCT International Search Report and Written Opinion; PCT/US2013/048129; dated Oct. 17, 2013.
PCT International Search Report and Written Opinion; PCT/US2013/048177; dated Oct. 21, 2013.
PCT International Search Report and Written Opinion; PCT/IB2014/063973; dated Nov. 28, 2014.
PCT International Search Report and Written Opinion; PCT/IB2014/063981; dated Feb. 10, 2015.
PCT International Search Report and Written Opinion; PCT/IB2014/063978; dated Dec. 19, 2014.
PCT International Search Report and Written Opinion; PCT/IB2014/063977; dated Nov. 28, 2014.
Allen, et al.; Upper Extremity Kinematic Trends of Fly-Casting; Establishing the Effects of Line Length; Sports Biomechanics; vol. 7, No. 1; Jan. 1, 2008; pp. 38-53.
First look at new Mio Link ANT +/Bluetooth Smart optical heart rate wrist band; http://www.dcrainmaker.com/2014/01/mio-link-first-look.html; Jan. 6, 2014 (accessed Apr. 19, 2016).
SAS, "SAS BI Dashboard 4.31 User's Guide", Second Edition, by SAS Electronic book; Aug. 1, 2012, downloaded at http://support.sas.com/documentation/cdl/en/bidbrdug/65580/PDF/default/bidrdrug.pdf.
StockCharts.com—Free Award-Winning Financial Charting Tools; http://www.stockcharts.com/ (accessed Aug. 24, 2016).
Fishbrain—Love Fishing More; http://www.fishbrain.com/ (accessed Aug. 24, 2016).
Fishbrain—AngelList; https://angel.co/fishbrain (accessed Aug. 24, 2016).
GoFree Apps & Software; https://gofreemarine.com/apps/ (accessed Aug. 31, 2016).
My Stringer App; https://itunes.apple.com/us/app/my-stringer/id536810604?mt=8 (accessed Aug. 31, 2016).
Fish Hunter—Portable Fish Finder—Fishing App; http://www.fishhunter.com/home (accessed Aug. 31, 2016).

* cited by examiner

SYSTEMS AND ASSOCIATED METHODS FOR GENERATING A FISH ACTIVITY REPORT BASED ON AGGREGATED MARINE DATA

FIELD OF THE INVENTION

Embodiments of the present invention relate generally to marine data analysis and, more particularly, to systems, assemblies, and associated methods for generating a fishing activity report based on aggregated marine data.

BACKGROUND OF THE INVENTION

Sonar data may be used for a number of different purposes, such as to detect features of and/or objects in an underwater environment. For example, when analyzed, sonar return data may be used to determine depths of a marine environment, detect fish or other waterborne objects, locate wreckage, among other things.

Fishing logs may be used to track a number and/or type of fish caught at a particular location or body of water. Additionally, fishing logs may include one or more condition parameters associated with each log entry, such as weather, temperature, date, number of lines or fisherman, or the like.

Applicant has developed apparatuses, systems, and methods described herein to more easily utilize sonar data and fishing logs for current and future fishing trips.

BRIEF SUMMARY OF THE INVENTION

Typically, fishermen rely on experience, chart marking, personal logs, and/or anecdotal evidence to plan future fishing expeditions. In some cases, fishermen may also scan areas of a body of water using a sonar transducer to determine a current activity level of fish or find structure that may attract fish.

In an example embodiment, sonar data from a plurality of marine electronic devices may be aggregated and analyzed for determining fish activity and generating a fishing activity report. Such a fishing activity report may be useful for future fishing expeditions or in real time. Advantageously, the fishing activity report may be generated based on or supplemented by sonar data gathered by other marine electronic devices. In some instances, the device generating the fishing activity report may not include or be associated with a sonar system. Location data and condition parameters may be gathered and associated with the sonar data, such as weather, air temperature, water temperature, date, time, or the like. A user, e.g. fisherman, charter captain, or the like, may submit a request including a location and one or more parameters, such as an upcoming date for a fishing trip. The sonar data may be filtered based on the request and a fishing activity report may be generated including, in some cases, portions of the sonar data. In some example embodiments, the portions of sonar data included in the fishing activity report may include an aggregation of all of the sonar data for the requested location and/or requested condition parameters, such as a density map or heat map. In another example, the portions of the sonar data included in the fishing activity report may include an average of the sonar data for the requested location and/or requested parameters.

In some example embodiments, the request may include a current location and/or current condition parameters. Additionally or alternatively, optimal fishing condition fishing locations and/or optimal fishing conditions may be determined, such as dates, water temperature, weather, current, bait types, or the like. An optimal fishing location and/or optimal fishing conditions may be determined in an instance in which the current location or current condition parameters correspond with the optimal fishing location and/or optimal fishing conditions, and an alert may be caused to indicate the corresponding locations and/or condition parameters to a fisherman.

In some instances, the fish activity report may be compared to a hot spot threshold and areas which satisfy the hot spot threshold may be displayed on a user interface, such as overlaid on a nautical chart.

In some instances, the user may enter fishing data, such as the number of fish caught, number of casts, fish type, bait type, or the like. The fishing data may be associated with the location and/or the sonar data, and the fishing activity report may also include the fishing data. In an example embodiment, the request may include a threshold for catches per fisherman, hour, or day, desired fish type, desired bait type, or the like. In some embodiments, the fishing activity report and/or the optimal fishing location or optimal fishing conditions may be further filtered based on additional requested parameters. In an example embodiment, a computing device is provided including a computing device including a processor and a memory including computer program code configured to, with the processor, cause the computing device to receive a plurality of sets of sonar data, current locations associated with the plurality of sets of sonar data, and condition parameters associated with the plurality of sets of sonar data from one or more marine electronic devices. The condition parameters are not the current locations and each of the plurality of sets of sonar data is data indicative of fish activity or a structure. The processor and memory are further configured to receive a request from a user to display a condition and location based fishing activity report. The request indicates at least one location and at least one condition parameter associated with desired fishing activity. The processor and memory are further configured to filter the plurality of sets of the sonar data based on the request to generate the fishing activity report. The fishing activity report includes one or more portions of the plurality of sets of the sonar data that are associated with the indicated at least one location and the at least one condition parameter. The processor and memory are further configured to cause display of the fishing activity report on a screen such that the one or more portions of the plurality of sets of the sonar data are displayed in a report that also indicates the at least one location and the at least one condition parameter from the request.

In an example embodiment, the processor and memory are further configured to determine one or more optimal fishing condition parameters based on the fishing activity report, compare at least one current condition parameter to a corresponding optimal fishing condition parameter, determine a correlation value between the at least one current condition parameter and the corresponding optimal fishing condition parameter, compare the correlation value to a predetermined correlation threshold, and cause an alert in response to the correlation value satisfying the predetermined correlation threshold.

In some example embodiments, the processor and memory are further configured to cause at least a portion of the fishing activity report to be overlaid on a nautical chart based on the location input.

In an example embodiment, the processor and memory are further configured to compare the fishing activity report to a predetermined hot spot threshold and the alert is generated in response to at least a portion of the fishing activity report satisfying the hot spot threshold.

In some example embodiments, the processor and memory are further configured to compare the fishing activity report to a predetermined hot spot threshold, cause an alert in response to the fishing activity report satisfying the hot spot threshold, cause an indication of one or more locations in which the fishing activity reports satisfies the predetermined fish activity threshold to be displayed on the user interface.

In an example embodiment, the fishing activity report includes a fish activity density map.

In some example embodiments, the fish activity includes an average of the one or more portions of the plurality of sets of the sonar data or an aggregate of the one or more portions the plurality of sets of the sonar data.

In an example embodiment, the fish activity report is further based on user input including at least a number of fish caught at a location. In some example embodiments, the user input further includes a fish type or bait type associated with the number of fish caught at the location, the request also includes an indication of a desired fish type or bait type from the user interface, and the fishing activity report is further based on the fish type or bait type associated with the number of fish caught at the location and the desired fish type or desired bait type.

In an example embodiment, the processor and memory are further configured to determine a fishing area based on the requested at least one location. Determining the fishing activity report includes determining the fishing activity report for at least a portion of the fishing area and comparing the fishing activity report to a hot spot threshold. Causing the fish activity report to be displayed includes displaying one or more areas in which the fish activity satisfies the hot spot threshold. In some example embodiments, each of the one or more areas is displayed such that the one or more areas are indicative of an amount in excess of the hot spot threshold, wherein at least one of the size, color, or pattern of the one or more areas varies with the amount in excess of the hot spot threshold.

In an example embodiment, the at least one condition parameter includes at least one of a temperature or date, wherein the processor and the memory are further configured to receive an indication of a current temperature, temperature input, current date, or date input, and wherein the fishing activity report is further based on the temperature or date and the current temperature, temperature input, current date, or date input.

In some example embodiments, the computing device also includes a user interface with the screen. The user interface includes a graphic user interface including at least one parameter selection region of the screen configured to display a plurality of parameters for user selection and at least one fishing activity report region of the screen configured to display a fish activity data graphic based on selected parameters. In an example embodiment, the fish activity data graphic is indicative of a number of fish catches per day or per man-hour and at least one sub-parameter.

Example marine electronic devices, computer program products, systems, and methods of the present invention may also include additional embodiments, such as described above with respect to the marine electronic device.

BRIEF DESCRIPTION OF THE DRAWINGS

Figure 1A:
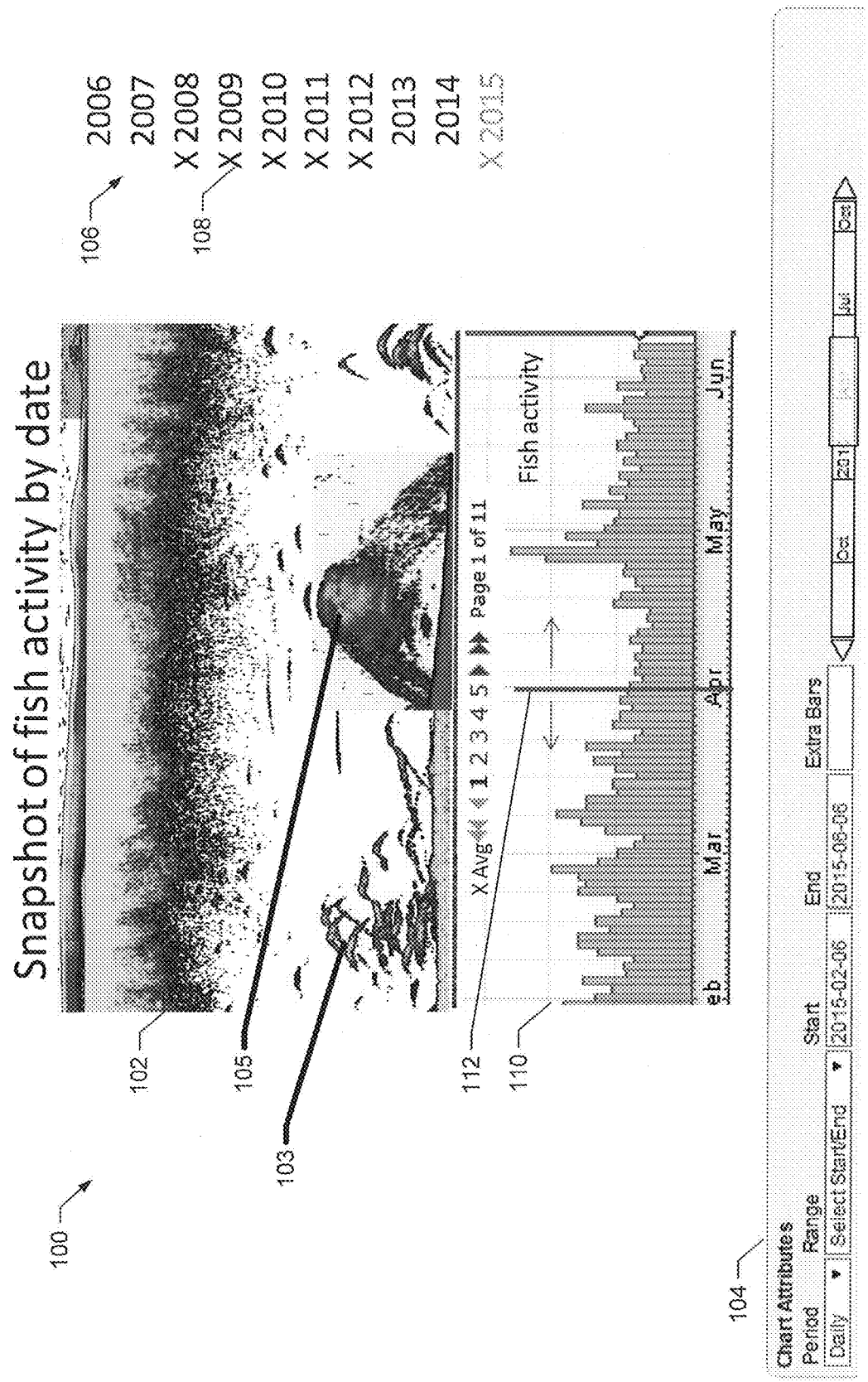
Figure 1B:
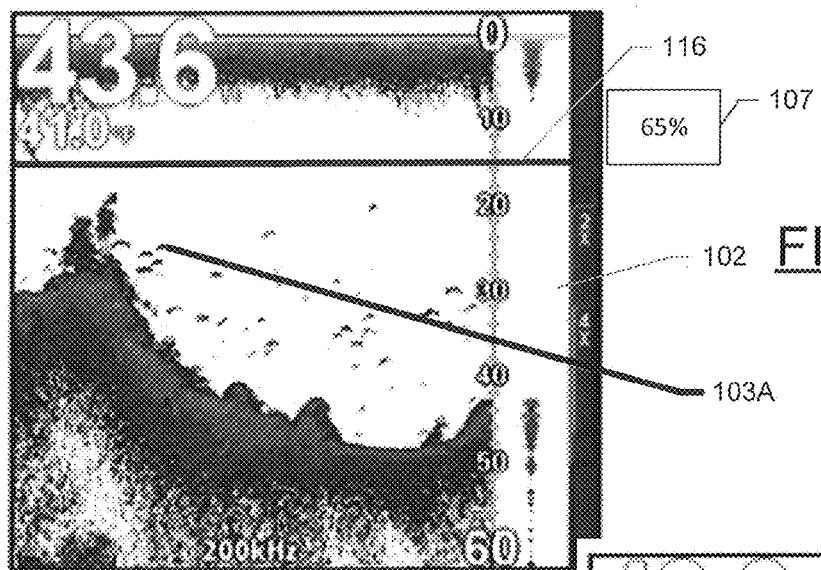
Figure 1C:
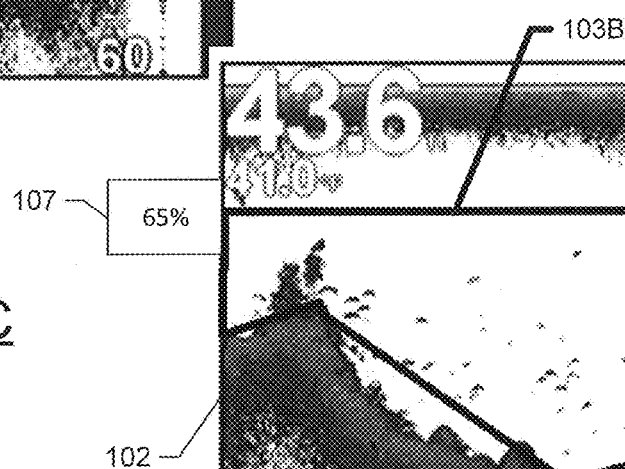
Figure 1D:
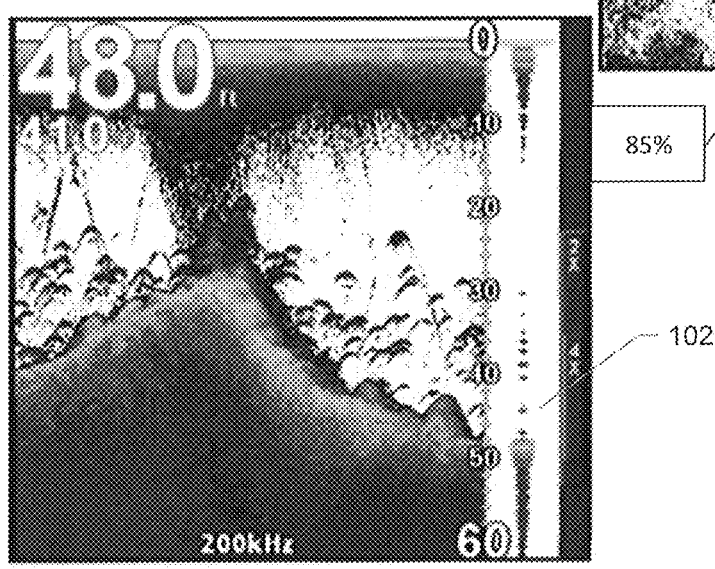
Figure 7:
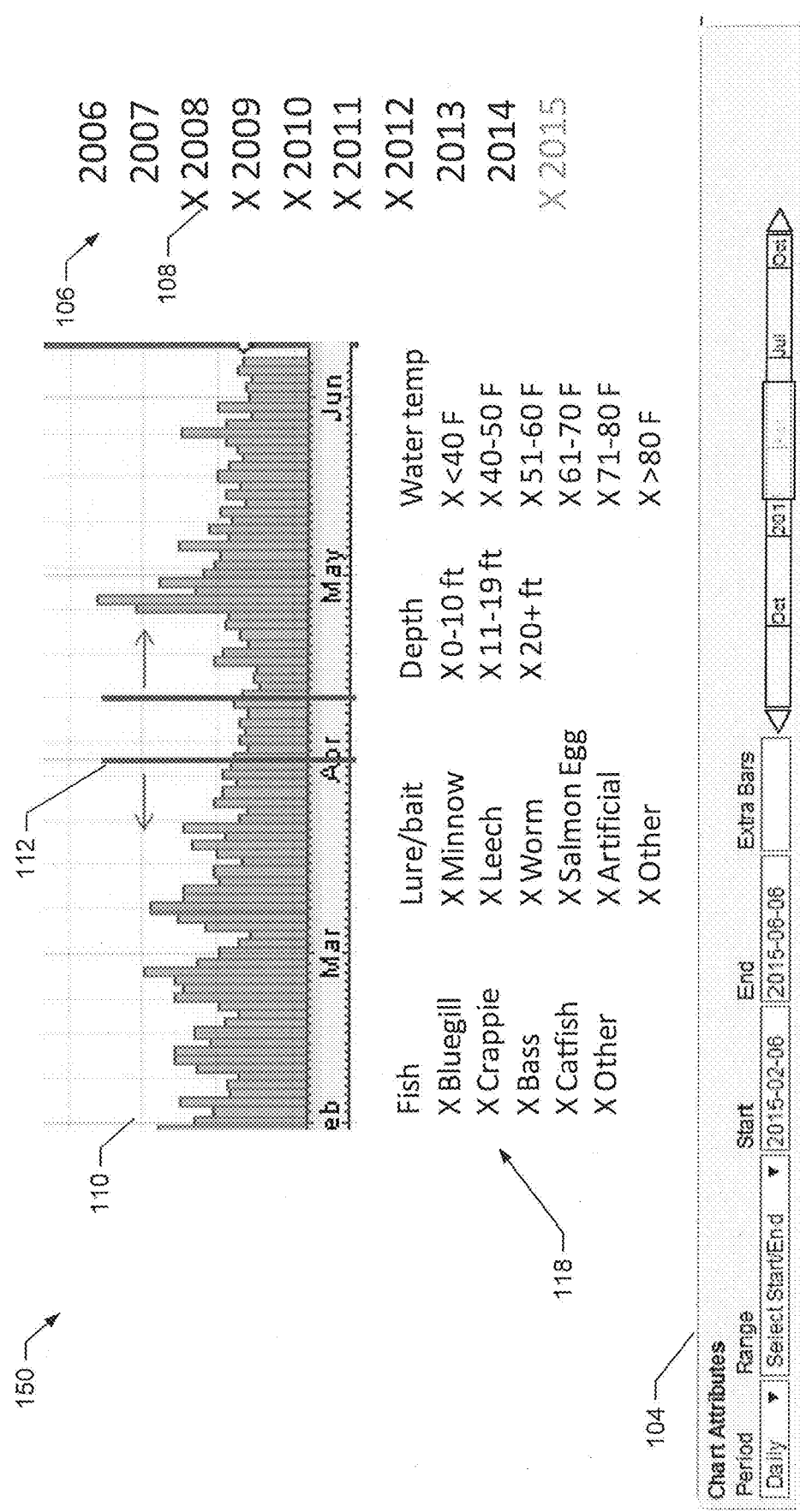
Figure 8:
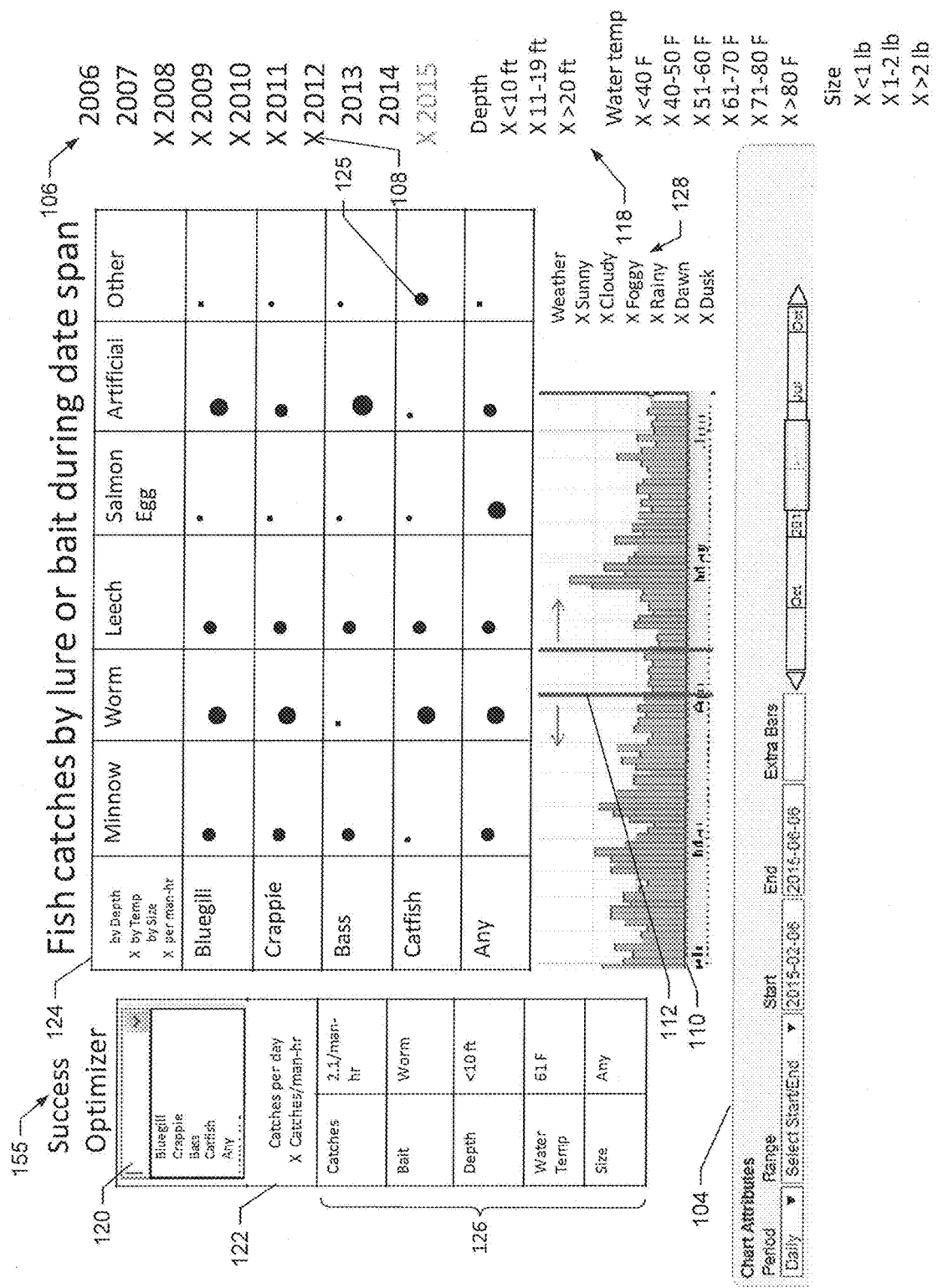
Figure 9:
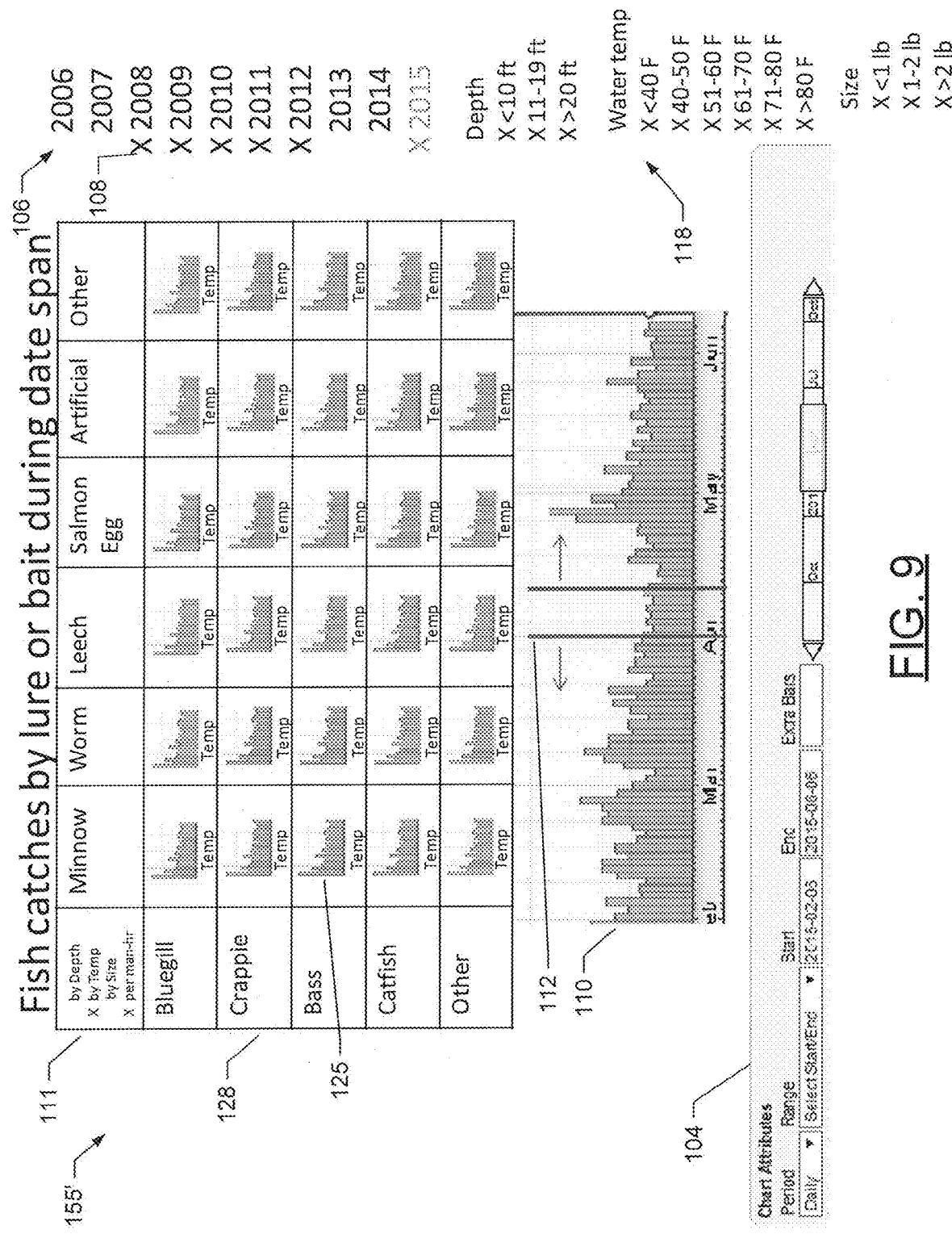
Figure 10:
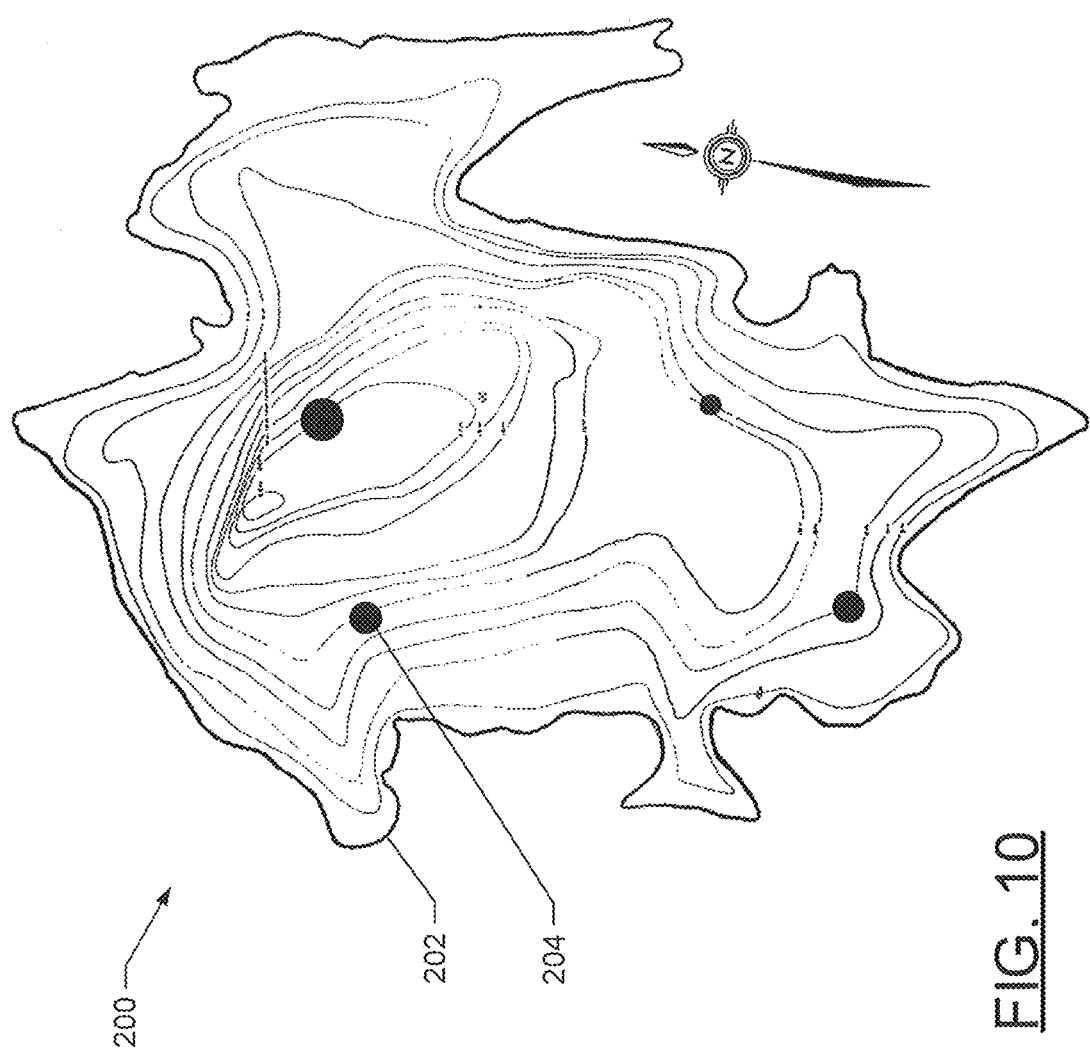
Figure 11:
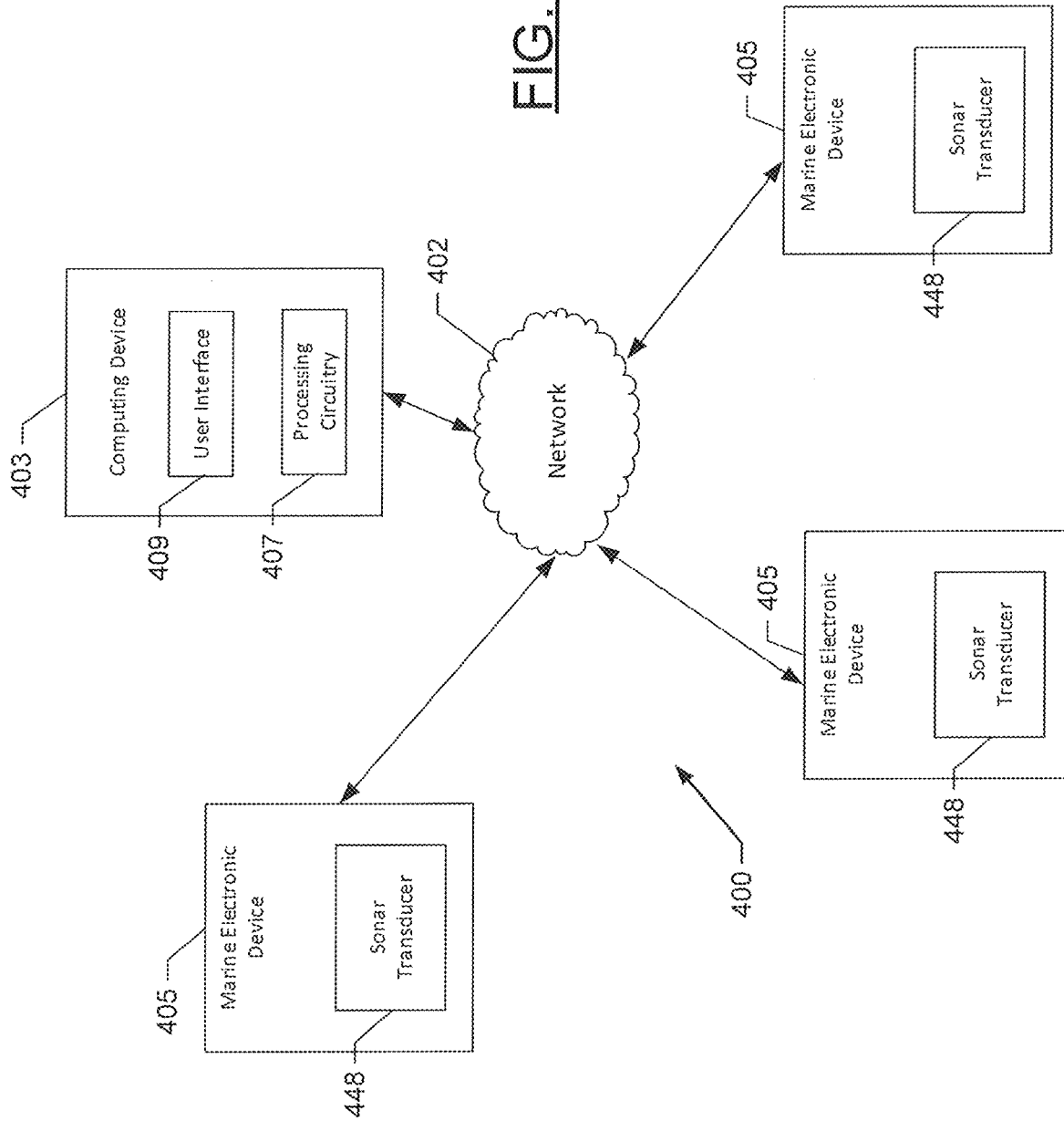
Figure 12:
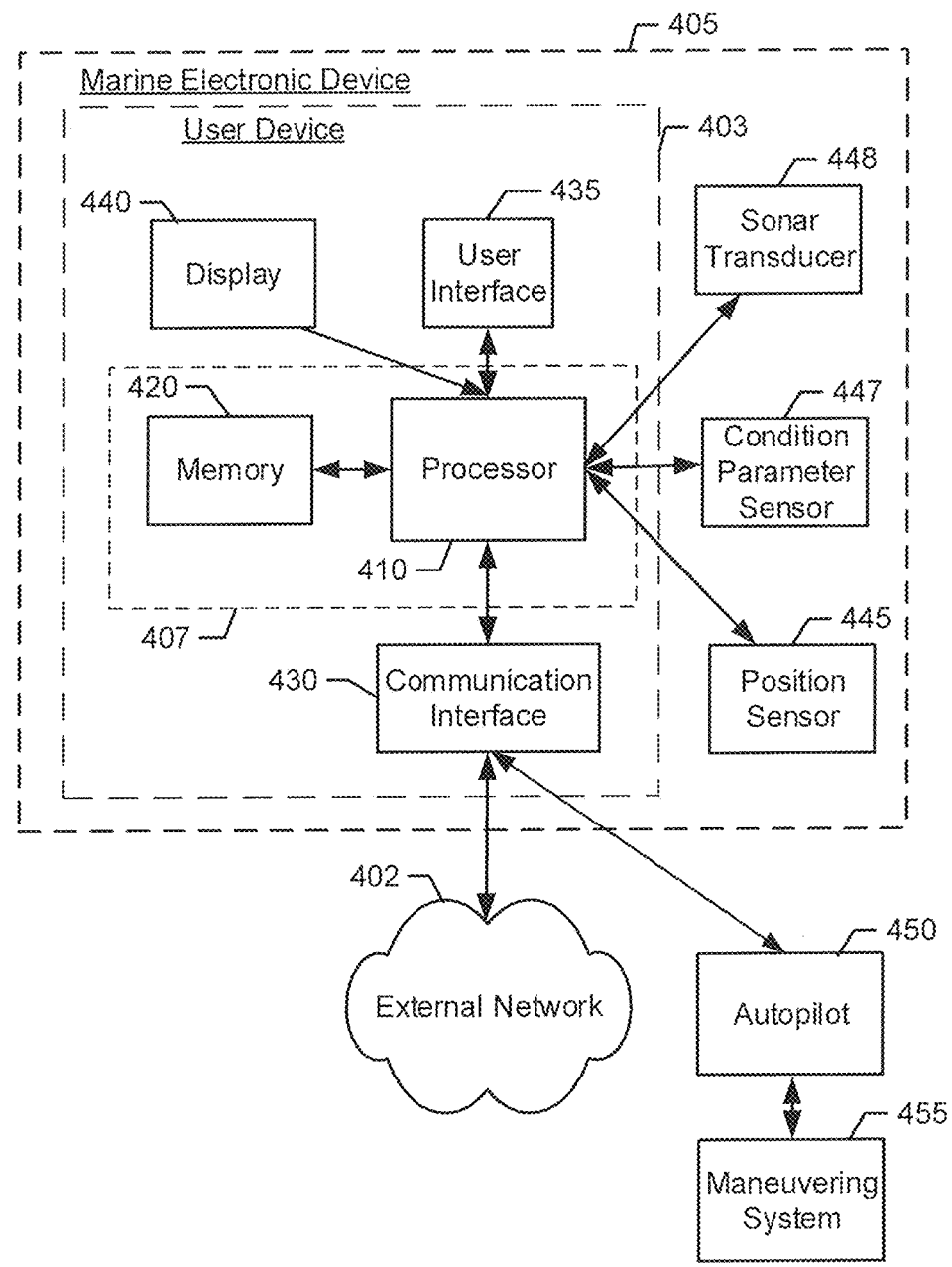
Figure 13:
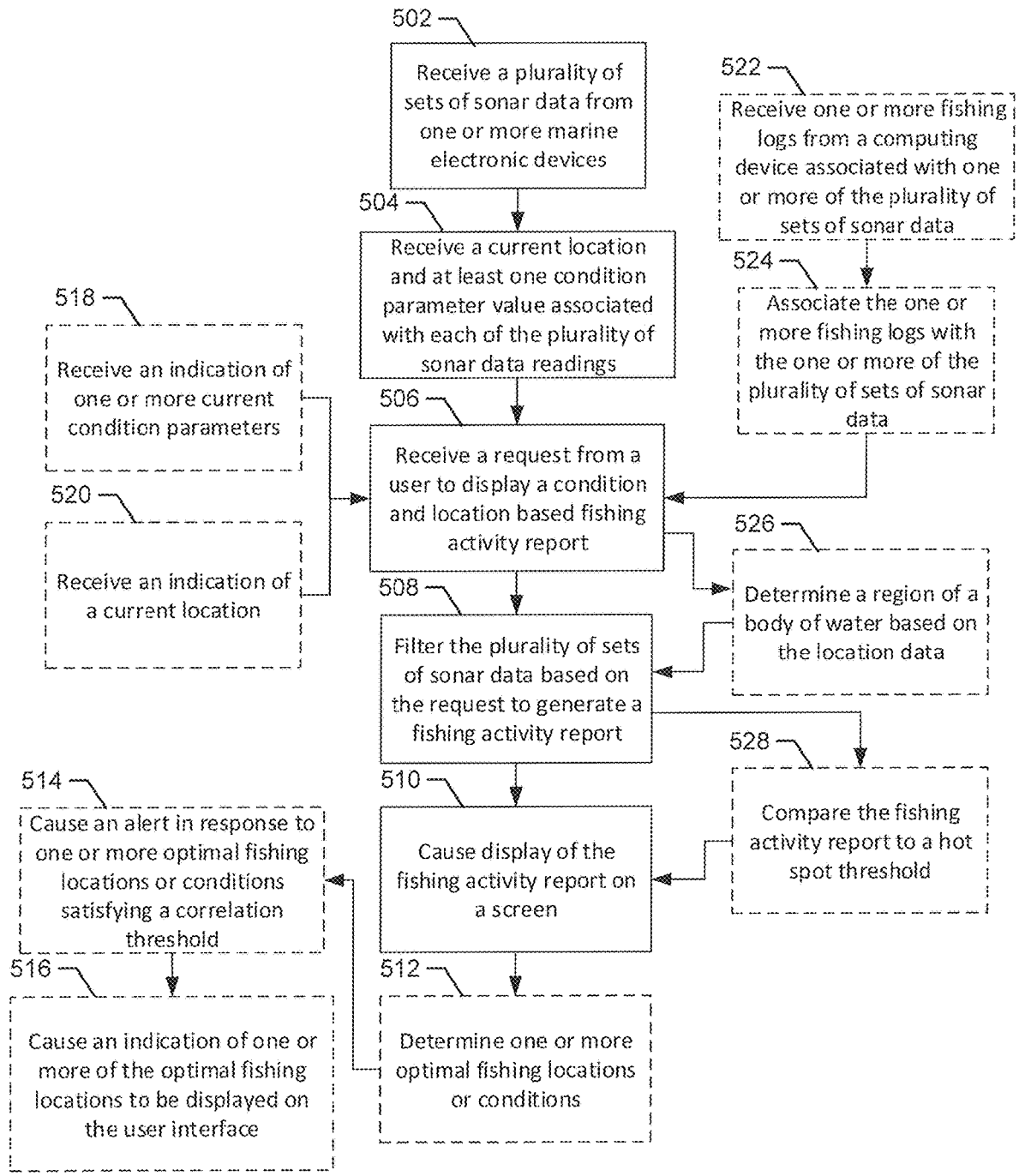

Having thus described the invention in general terms, reference will now be made to the accompanying drawings, which are not necessarily drawn to scale, and wherein:

FIG. 1A illustrates an example fishing activity report in accordance with some embodiments discussed herein;

FIGS. 1B-1D illustrate an example fish activity determination in accordance with some embodiments discussed herein;

FIGS. 2-6 illustrate additional example fishing activity reports in accordance with some embodiments discussed herein;

FIG. 7 illustrates an example parameter selection screen in accordance with some embodiments discussed herein;

FIGS. 8-9 illustrate example optimal fishing condition reports in accordance with some embodiments discussed herein;

FIG. 10 illustrates a nautical chart including areas in which the fishing activity report exceeds a threshold in accordance with some example embodiments discussed herein;

FIG. 11 illustrates a block diagram illustrating an example marine data system in accordance with some embodiments discussed herein;

FIG. 12 illustrates a block diagram of an example marine electronic device and system in accordance with some example embodiments discussed herein; and FIG. 13 illustrates a flowchart of example methods of generating and displaying a fishing activity report according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

A watercraft configured to traverse a marine environment may use a marine data system disposed on and/or proximate to the watercraft. The watercraft may be a surface watercraft, a submersible watercraft, drone watercraft, drone aircraft, buoy, or any other implementation known to those skilled in the art. The marine data system may be used to acquire sonar data corresponding to an area of water proximate to the watercraft, including areas to the side of, behind, below, and/or to the front of the watercraft. Such sonar data may be used to identify objects in the area of water, such as fish, logs, debris, structure, or the like, or identify features of the body of water, such as depth and bottom contours. Although generally described and depicted as two dimensional sonar, the sonar data may, additionally or alternatively, be three dimensional (3D) sonar data and displayed accordingly.

In one implementation, a sonar system associated with a marine electronic device of a marine data system may include one or more sonar transducers (e.g. sonar transducer 448 shown in FIG. 12). The sonar transducers may be in the form of one or more castable transducers, remote mounted transducers, and/or any other implementation of transducers known to those skilled in the art. The one or more sonar transducers may be configured to produce one or more sonar output signals, e.g. sonar beams or pulses, and emit the sonar output signals into the body of water. Properties of the sonar output signals generated by the transducer may be determined by an area and shape of the sonar transducer, the sound wave frequency of the sonar transducer, the sound velocity of the propagation medium (e.g. a body of water), or the like.

Reflected sonar output signals may be received by the sonar transducer in the faint of one or more sonar return signals. Sonar data may represent one or more sonar return signals that have reflected from a surface of an object in the body of water. In one implementation, an object may be a point on an underwater floor, a portion of a fish, a piece of debris, an object which attracts fish (e.g. submerged bridge, tree, rock, or the like) herein referred to as a "structure", and/or any other waterborne object. The sonar data may be communicated to a computing device for analysis, display, storage, transmission, or the like.

In some instances the sonar data may be associated with date or time information of the capture of the sonar data. For example, the sonar data may be time stamped.

The computing device may be a marine electronic device (e g marine electronic device 405 shown in FIG. 12), such as a multi-function display (MFD) device, a fish finder device, a dedicated sonar module, smart phone, laptop computer, tablet computer, personal data assistant (PDA), and/or any other implementation known to those skilled in the art. In other implementations, the marine data system may include a plurality of marine electronic devices (e.g. the marine data system 400 shown in FIG. 11).

The marine electronic device may also include or be associated with a position sensor, such as a global position system (GPS) sensor. The position sensor may be configured to determine a location of the marine electronic device and/or associated watercraft. The location may be a body of water, a region of a body of water, or a specific point on a body of water. The marine electronic device may associate location data indicative of the location with the sonar data, such by time stamping the location data, creating a cross reference, or storing the association in a common memory location. Additional details about the sonar data, such as the type, relevance, and user-generated notes may also be indicated on the marine electronic device.

The marine electronic device may also include one or more condition parameter sensors configured to measure environmental parameters. The condition parameter sensors may include, for example, an air temperature, a water temperature, a current sensor, a wind sensor, a speed sensor, sea state sensor (e.g. an accelerometer), among many others. The marine electronic device may associate sensor data indicative of the condition parameters from each of the condition parameter sensors with the sonar data and/or the location data, such as by time stamping the sensor data, cross referencing the association with the sensor data, or storing the association with the sensor data in a common memory location.

In some example embodiments, the marine electronic device may include or be associated with a user interface. In some example embodiments, the user interface may be a portion of or associated with a remote computing device, such as smart phone, laptop computer, tablet computer, or the like. The user interface may be utilized by a fisherman such as to enter user input indicative of a number of fish caught. The number of fish caught may be associated with a particular location and/or particular time (e.g. entered on a per catch basis), a region of the body of water and/or a time period (e.g. entered on a per fishing area basis), or a fishing trip including the route and time period of the fishing trip. The user input may also include the type of fish caught, the size of the fish caught, the bait used to catch the fish, number of lines or nets, number of active fishermen, or the like.

Additionally, the user input may include environmental observations, such as sea state, weather conditions, air temperature, water temperature, water level of the body of water, or the like. The marine electronic device may associate the user input with the sonar data, sensor data, and/or location data, such as by time range or time stamp, creating a cross reference, or storing it in a common memory location.

In an example embodiment, additional environmental data may be retrieved from local or remote databases. The additional environmental data may include, for example, fish stock populations for a body of water, tide tables, lunar or planetary cycles, weather data, permitted fishing seasons, tourist seasons, or the like. The marine electronic device may associate the additional environmental data with the sonar data, sensor data, and/or the location data, such as based on time stamps and time data, creating a cross reference, or storing it in a common memory location. Additionally or alternatively, the additional environmental data or portions of the additional environmental data may be retrieved by the computing device making the request for the fishing activity report, as discussed below.

The sonar data, sensor data, location data, and/or additional information data may be locally stored in a memory associated with the marine electronic device and/or transmitted to a remote storage location. The remote storage locations may include a remote server, one or more other marine electronic devices, and/or one or more computing devices, e.g. smart phones, laptop computers, navigational chart display systems, or the like.

In an example embodiment, a computing device may receive a request from a user to display a condition and location based fishing activity report. The request may include a location, such as a desired location or current location, and at least one condition parameter, such as date, time, water temperature, air temperature, water level, weather, depth, or the like.

The computing device may retrieve at least a portion of the sonar data, sensor data, location data and/or the additional environmental data from a local memory, remote memory or databases, or third party databases, such as historic weather conditions archive associated with a website or other server. For example, the computing device may retrieve all of the sonar data, sensor data, user input, and additional environmental data for a location specified in the request. In some example embodiments, the computing device may retrieve only the sonar data, sensor data, user input, and additional environmental data for a specific body or water or a region or a body of water based on the location data which specifies a particular location.

The computing device may filter the sonar data, sensor data, user input, and/or additional environmental data to generate a fishing activity report. The fishing activity report may include portions of a plurality of sets of the retrieved and filtered sonar data. In some embodiments, the fish activity report may include additional information, such as catch rates, types of fish caught, types of bait used, water temperature, depth, areas of higher fish activity or the like. The computing device may cause the fishing activity report to be displayed on a user interface screen for the user to view.

FIGS. 1-6 illustrate example fishing activity reports 100 in accordance with some embodiments discussed herein. Turning to FIG. 1A, the fishing activity report 100 may include a sonar image 102. The sonar image 102 may include an indication of fish activity 103 and/or one or more structures 105. The sonar image 102 may be an example sonar image from sonar data which meets the filter criteria, such as the same or similar time of year, water temp, location or the like. In another embodiment, the sonar image 102 may be composition sonar image, such as an average of the sonar data for the location, time and/or other specified condition parameters. In a further embodiment, the sonar image 102 may be composite sonar image including a fish activity density or heat map. The computing device may generate the heat map by plotting instances of fish activity in each sonar image which satisfies the specified time or condition parameters. The plots may be shown in contrast to the background based on the number of plots in the image area, for example a displayed number, displayed larger, displayed in different color, or the like. In a sonar image 102 rendered in color, the background may be displayed as blue and, as fish activity plots are added, the plotted area may turn from green to yellow, to orange, to red, etc.

The computing device may display structures 105 which appear in the sonar data as a portion of the sonar image 102. In some example embodiments the computing device may automatically determine the presence of one or more structures 105 in the sonar data. For example, the computing device may perform object recognition or other image analysis to determine a structure 105, such as a tree, collapsed dock, rock, or the like. The computing device may highlight the identified structures in the sonar image 102, such as by an arrow, different background color proximate to the structure 105, or the like. Additionally or alternatively, the structures 105 may be identified by a user, e.g. fisherman, such as in a portion of a fishing log. A user may select a portion of a sonar data and annotate that the portion of the sonar data is indicative of a structure. The annotation of the sonar data may be included in fish activity reports based on the sonar data including the annotation.

The fishing activity report may be displayed in multiple or alternative illustrations which may be used to select or indicate a selected condition parameter or parameters, for example a bar graph 110 may be provided. The bars of the bar graph 110 may indicate a fish activity value for a period of time, such as for each day at the specified location. A slider 112 may be displayed on the bar graph to illustrate the selected time period represented by the sonar image 102. The condition parameter selection indicated by the slider 112 may be based on user input, such as entering a value on a key pad, using a cursor or arrow key to position the slider 112, or using a touch screen to position the slider. In the depicted example, the slider indicates a single date in early April. The bar graph 110 and slider 112 may be rendered in alternative forms, such as a calendar and highlighted dates, line graph, or the like based on user display selections 104. Multiple fish activity data series may be shown in the bar graph 110, or a single series representing an average fish activity. In some example embodiments, a 3D bar graph 110 may be used to represent the fish activity. In an example embodiment, the bar graph 110 and sonar image 102 may be changed using finger gestures such as swiping left or right. Additionally or alternatively, the availability of archived sonar data for a given location may be indicated by the bar graph 110 or by a calendar with a number, color, symbol or bubble size indicating the amount of archived sonar data. In an example embodiment, the availability of sonar data for different locations associated with a body of water or a portion of a body of water may be displayed on a map, e.g. a nautical chart. The availability of sonar data at the different locations may be indicated on the map by a heat map or 3D surface, different size bubbles, or the like.

FIGS. 1B-1D illustrate an example fish activity determination, which may be performed by the computing device. In the illustrated example, the sonar resolution 107 has been set to 65 percent to reduce noise in the sonar image 102. In some example embodiments, a reference depth 116 may be set, above which the computing device will not analyze to further reduce noise and surface clutter. The computing device may determine a number of fish 103A and or an area or percentage of the sonar image 102, which may be attributed to fish. Next, in FIG. 1C, the computing device may determine a total area of water 103B below the surface of the body of water. The total area of water 103B may be an approximation of the water area, such as a rough line or box of the water area. In another example embodiment, the computing device may utilize bottom contouring of the sonar image and/or other sensors, e.g. fathometer, to calculate more precise total area of water 103B. The computing device may divide the total number of fish 103A or fish area by the total area of the body of water 103B, resulting in a numerical representation of fish activity in fish per unit area or percentage of the sonar image 102. The process may be repeated at different resolution levels, such as 85 percent as depicted in FIG. 1D. In some embodiments, the computing device may average or calculate a weighted average of the numerical representations of fishing activity at the different resolution levels, for example lower resolutions may have a higher weight due to less noise. In an example embodiment in which three dimensional sonar data is being utilized, the computing device may perform the fish activity analysis in units of volume instead of units of area.

In an example embodiment, an analysis similar to fish activity determination may be performed to identify structures. The computing device may additionally determine movement over a predetermined period of time, for example one minute, two minutes, or the like. Fish area which, for example, exceed the predetermined threshold without movement may be determined to be structures.

In some example embodiments, the computing device may perform a statistical analysis of the fish activity for the specified period of time. For example, the computing device may generate and display a distribution curve for the fish activity for the specified period of time. The fish activity display may include the unit of measurement to quantify the fish activity, such as fish per unit area, fish area per unit area, or the like. In some example embodiments, the statistical analysis may be utilized in a determination of optimal fishing locations and or optimal fishing conditions, as discussed below in reference to FIGS. 8-9. In such an example embodiment, the computing device may utilize comparative statistical analysis, such as a t-test of means, of a plurality of distribution curves to determine optimal fishing locations and/or conditions, or to monitor fish population trends over time, such as year-over-year. The statistical analysis may be qualitatively or quantitatively displayed on the nautical chart for comparison by the fisherman.

In the depicted example fishing activity report 100, the user interface inputs are also displayed, and in some instances may be selectable. In the depicted example the date selector 106 is displayed. A selection indicator 108, e.g. "X" or other indication of selection, may be displayed proximate to the user input selected; here the user input range or available data range of the date selector 106 includes 2006 through 2015. The selection indicator 108 includes a selection of 2008 through 2012 and 2015. The 2015 date selector 106 is grayed in the example embodiment, which is indicative of 2015 being the baseline year.

The sonar image 102 as depicted in FIG. 1A may be a composite image of the sonar data for the first of April of 2008, 2009, 2010, 2011, 2012, and 2015. The composite image may be an average or a heat map.

Figure 2:
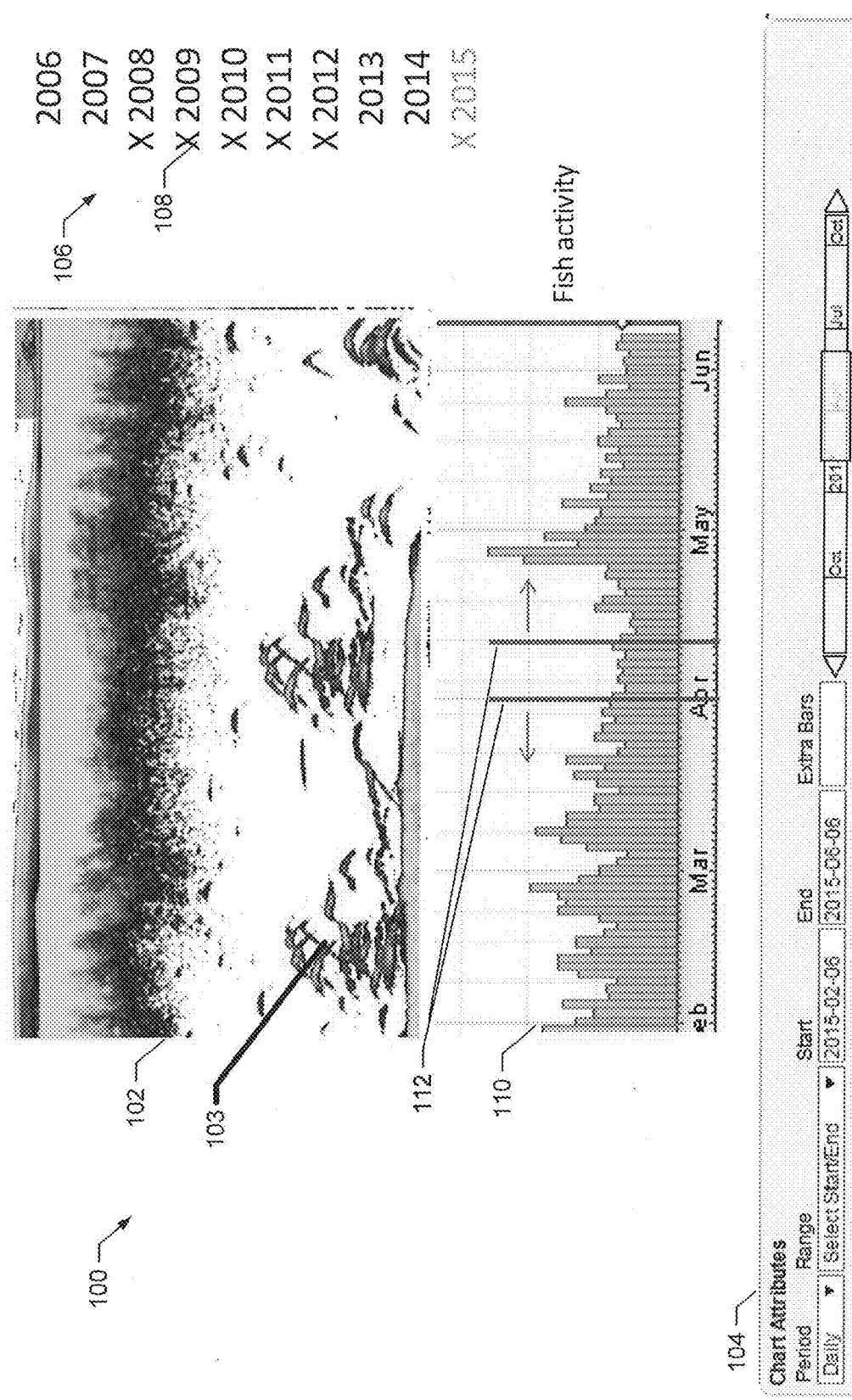

In FIG. 2, the selected time period has been expanded, as indicated by slider 112. Slider 112 indicated a selected date range of approximately the first week in April. The sonar image 102 as depicted in FIG. 2 may be a composite image of the sonar data for the first week of April of 2008, 2009, 2010, 2011, 2012, and 2015. The composite image may be an average or a heat map. The fish activity 103 in the sonar image 102 as indicated by the sonar data increased, particularly in the lower right region of the sonar image 102, based on the fish activity associated with the increased time period.

In some example embodiments, the computing device may compare the fishing activity report to a predetermined hot spot threshold, such as 3 fish or plots, 5 fish or plots, 10 fish or plots, or the like indicated by the sonar image 102. In response to the fishing activity report satisfying the hot spot threshold, the computing device may cause an alert, such as an audio or visual indicator to call a user's attention to the report. For example, the alert may be a sound from speakers, a popup message on a user interface, a text message, an email, or the like. In an example embodiment, an indication of the hot spots may also be shown or displayed on a map, as discussed below in reference to FIG. 10.

In some example embodiments, the location data may be a body or water or a region of a body of water. The computing device may determine one or more particular locations in which the fishing activity report exceeds the predetermined hot spot threshold. The fishing activity report may additionally include a nautical chart, such as nautical chart 200 of FIG. 10. The nautical chart 200 may include the body of water 202 and one or more location indicators 204. Each of the location indicators may be indicative of a location which the fish activity report exceeded the fish activity threshold. The location indicators 204 may vary in size, color, or pattern of the one or more areas with the amount in excess of the hot spot threshold. For example, the location indicator may be larger for each fish or plot in excess of the hot spot threshold. In some example embodiments, an alert may be generated to notify the user that at least a portion of the fishing activity report exceeds the hot spot threshold, such as an audio alarm or beep, an email, a popup dialog box, a text message, or the like. In some embodiments, the alert may include or be associated with the nautical chart 200.

Figure 3:
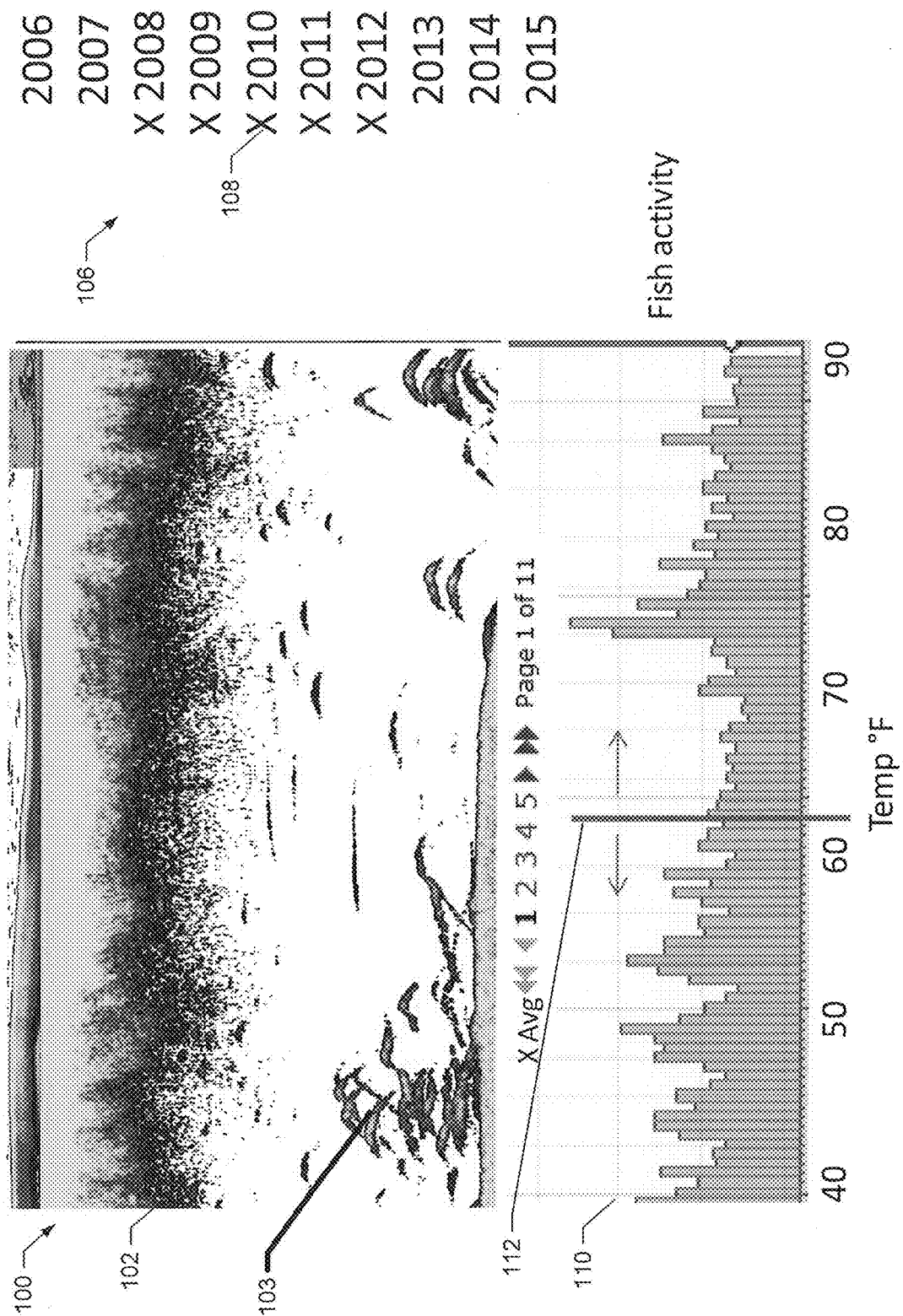

FIG. 3 depicts a fishing activity report 100, in which the bar graph 110 indicating fish activity is based on water temperature. The slider 112 has been selected for a water temperature of approximately 63 degrees Fahrenheit (F). Additionally, the date selectors 106 include selection indicators for 2008 through 2010. In the illustrated example, the sonar image 102 including fishing activity 103 may include a composite sonar image, e.g. average or heat map, based on the sonar data for the specified years and at the specified condition, e.g. 63° F. In some example embodiments, the computing device may include a band for the specified condition parameter, such as +/−2° F., to expand the sonar data available for generating the sonar image 102.

Figure 4:
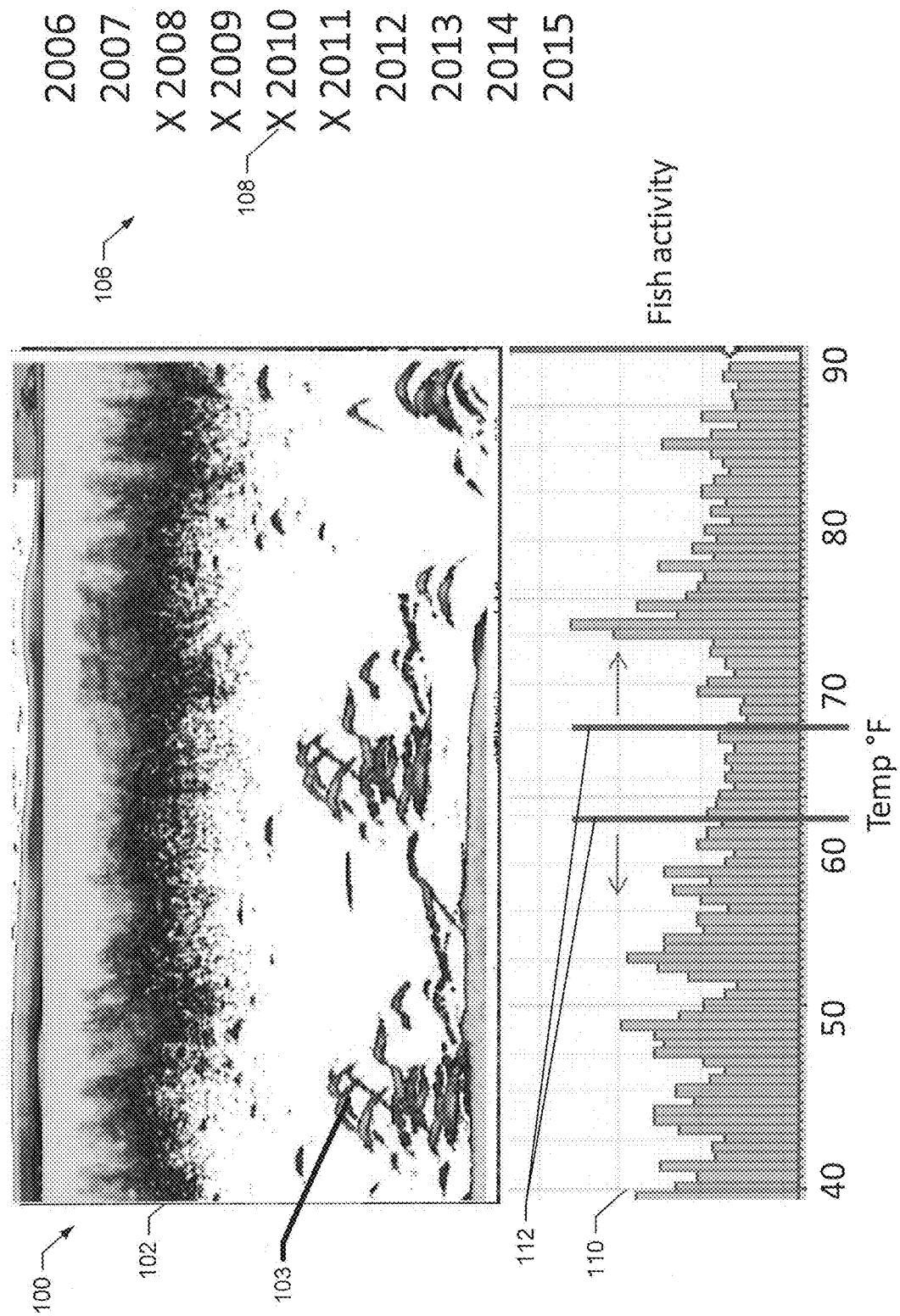

Similar to FIG. 2, the slider of FIG. 4 has been expanded to include a larger range. The slider 112 of bar graph 110 indicates a selected water temperature range of 63° to 68° F. The fish activity 103 in the sonar image 102, as indicated by the sonar data, increased, particularly in the lower right region of the sonar image 102, based on the fish activity associated with the increased temperature range.

Figure 5:
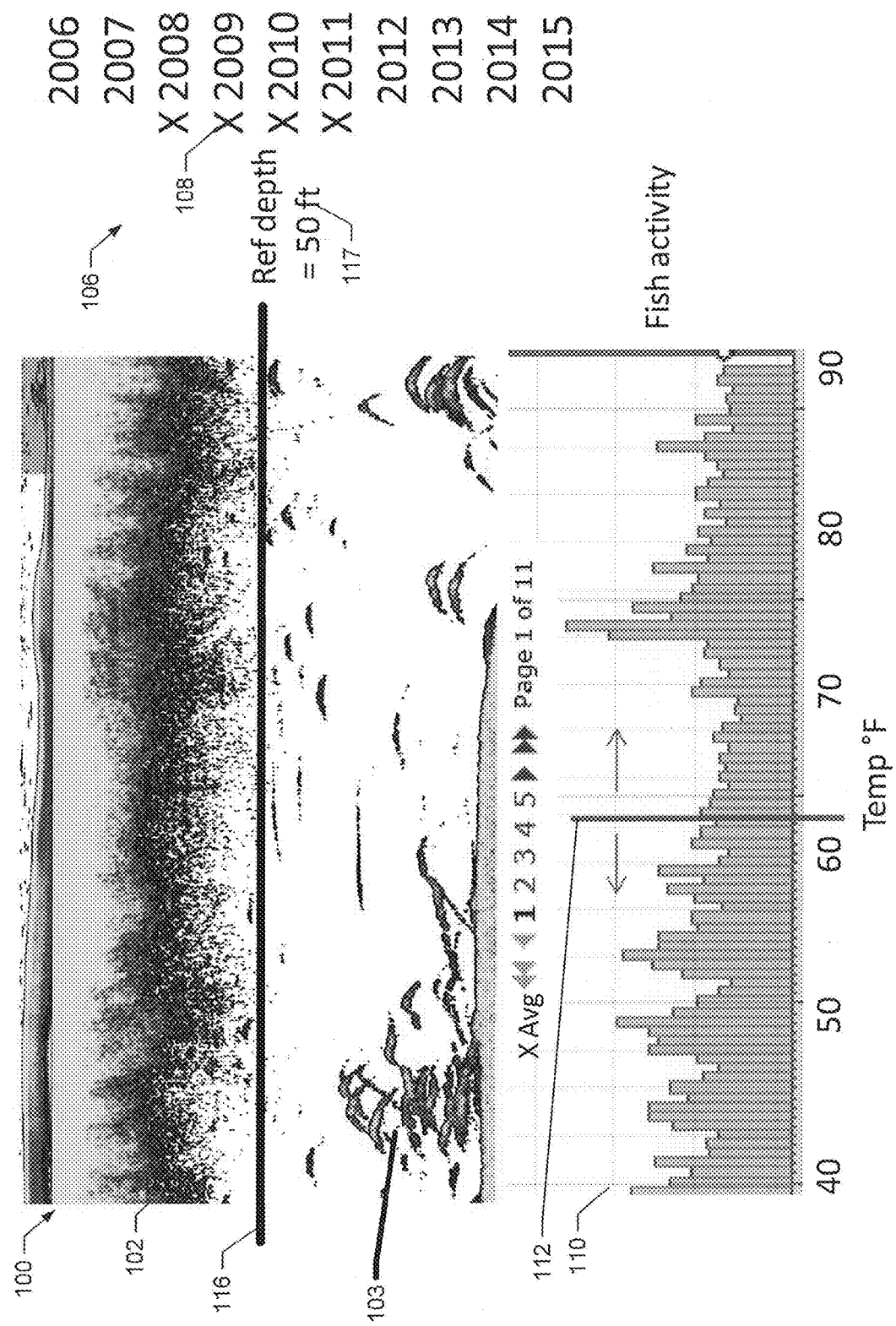
Figure 6:
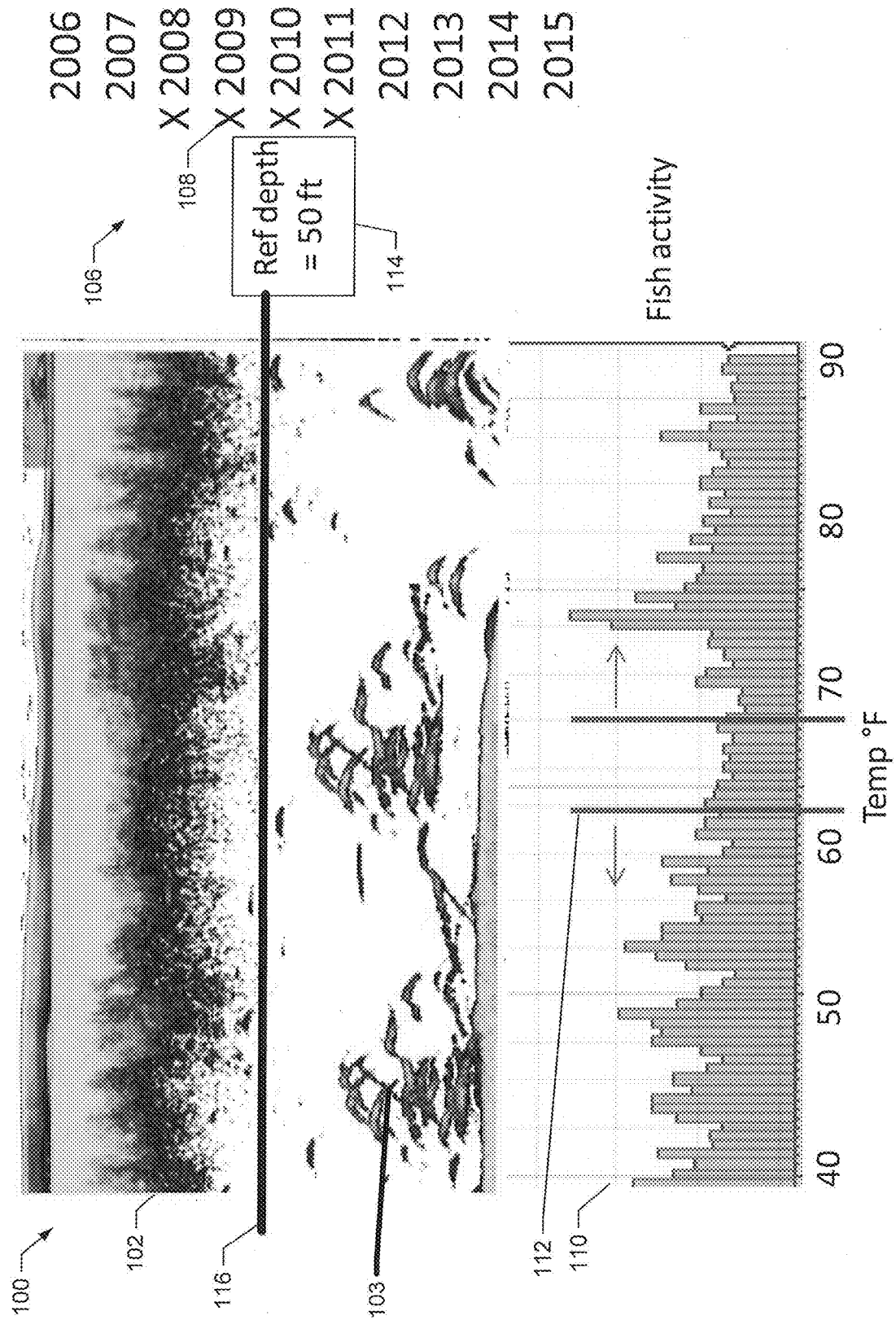

FIGS. 5 and 6 illustrate example fishing activity reports, which are substantially similar to the fishing activity reports of FIGS. 3 and 4. FIGS. 5 and 6 include a reference depth for the water temperature data. For example the temperature sensor may be castable or attached to an anchor line, or located near a transducer, such that the temperature sensor may measure the water temperature at the water surface or as the temperature sensor descends it may measure temperature at different depths. The computing device may further filter the fishing activity report based on the reference depth. The sonar image 102 may be a composite sonar image based on sonar data from the specified location with a specified temperature at a specified depth. The sonar image 102 may include a reference depth indicator 116 and a reference depth value 117, such as 50 ft in the depicted example.

FIG. 7 illustrates an example parameter selection screen 150 in accordance with some embodiments discussed herein. The parameter selection screen 150 may include the fish activity bar graph 110 indicative of fish activity, the slider 112, and the user display selections 104. The depicted bar graph is a date bar graph in which the first week of April is selected. The parameter selection screen may also include the date selector 106 and selection indicator 108. The selection indicator 108 includes a selection of 2008 through 2012 and 2015.

In addition or as an alternative to the bar graph 110 and the date selector 106, the parameter selector may include selectable parameters 118. The selectable parameters 118 may include desired fish types, desired bait type, desired depth, desired or anticipated water temperature, weather conditions, or the like. The selection of a selectable parameter may be indicated by a check, an "X," or the like. In an instance in which the selectable parameter includes a range, such as water temperature, a bar graph 110 may be used (such as by replacing the bar graph 110 based on date or by being introduced into the display field by drop down or popup menu). The popup menu may be used to select a parameter range of the selected parameter. In the depicted selectable parameters 118, example fish types include: bluegill, crappie, bass, catfish, and other; lure/bait types include: minnow, leech, worm, salmon egg, artificial, and other; depth ranges include: 0-10 ft, 11-19 ft, and 20+ ft; and water temperature ranges include: <40° F., 40°–50° F., 51°–60° F., 61°–70° F., 71°–80° F., and >80° F. Each of the parameters available for selection has been selected in the depicted example.

In an example embodiment, the computing device may be configured to determine optimal fishing conditions based on the location and one or more selected parameters. FIGS. 8-9 illustrate example optimal fishing condition reports 155 in accordance with some embodiments discussed herein. The optimal fishing conditions report may include a chart 124 of fish type catches by bait/lure type for a selected time period. The time period may be based on the date selector 106 and selection parameters 118. In the depicted embodiment, the selected parameters 118 include weather conditions 128. The weather conditions 128 available for selection include sunny, cloudy, foggy, rainy, dawn, and dusk. In the depicted example, the values selected in the date selector 106, bar graph 110, and selectable parameters 118 are substantially similar to those selected in FIG. 7. All of the parameters of the weather parameters 128 have been selected in the depicted embodiment.

The chart 124 may include a frequency indicator 125 for each type of fish caught by each type of bait/lure. The frequency indicator 125 may be a number, a color, or a change in the relative size of the indicator, e.g. larger for a greater number of instances.

In some instances the computing device may determine one or more optimal fishing conditions 126, e.g. a success optimizer. In some cases, the success optimizer optimal fishing conditions may be based on the sonar data and/or user input associated with the selected sensor data, e.g. selected parameters, and/or the additional environmental data. The optimal fishing conditions may be filtered based on a fish type selector 120, or the number of catches per man/hour or day 122. The optimal fishing conditions 126 may include one or more values for condition parameters, which are likely to have the highest success rate based on the selected parameters. In the depicted example, including a selection of catches per man/hour and any fish type, the optimal fishing conditions 126 include bait type: worm, Depth: <10 ft; water temperature: 61° F.; and no specified size, yielding a likely catch rate of 2.1 catches per man/hour.

In some example embodiments, the computing device may determine locations which meet the optimal fishing conditions based on current parameter values from one or more sensors associated with the computing device, remote marine electronic devices, or remote sensors associated with the locations. Additionally or alternatively, the computing device may determine locations which satisfy the optimal fishing conditions based on historical parameter values associated with the locations. The computing device may compare the current and/or historical parameter values to the optimal fishing conditions. The computing device may determine a correlation value between the current and/or historical condition parameter values and the optimal fishing conditions and compare the correlation value to a predetermined correlation threshold, such as 75 percent, 80 percent, or the like. In response to satisfying the predetermined correlation threshold, the locations which satisfy the optimal fishing conditions may be indicated on a nautical chart, such as the nautical chart 200 depicted in FIG. 10. The nautical chart 200 may include a body of water 202 and location indicators 204. The computing device may cause an alert to notify the user of the optimal fishing locations.

The computing device may also compare the current location to the optimal fishing locations and generate a correlation value. The computing device may compare the correlation value to the predetermined correlation threshold, and in response to satisfying the predetermined correlation value, the computing device may cause an alert indicative of the current location being near or within the optimal fishing location. In some example embodiments, the alert may be generated based on a current direction from the current location intersecting with or being proximate to one or more of the optimal fishing locations. In some example embodiments, a pop-up chart, such as bar graph 110 may be shown may be displayed showing available sonar data, fishing logs, and/or fish activity by date for each of the optimal fishing locations.

Additionally or alternatively, the computing device may compare current parameter data to the optimal fishing conditions to generate a correlation value. The computing device may compare the correlation value to the predetermined correlation threshold and cause an alert in response to the correlation value satisfying the predetermined correlation threshold, indicative of the current condition parameters being substantially similar to the optimal fishing conditions.

Turning to FIG. 9, the optimal fishing condition report 155' is substantially similar to the optimal fishing condition report 155 of FIG. 8, but does not include the optimal fishing conditions 126. The frequency indicator 125 includes a bar graph based on a selected condition parameter. In the depicted embodiment, the frequency indicator includes several frequency bar graphs of fish activity based on water temperature for each combination of species and lure or bait. In an example embodiment, the graphs may be enlarged using a cursor or finger gesture.

Example System Architecture

FIG. 11 illustrates a block diagram of a marine data system 400. The marine data system may include one or more marine electronic devices 405, at least one computing device 403, and a network 402. The marine electronic devices 405 may include a sonar transducer 448. The sonar transducer 448 may be configured to generate sonar data indicative of fish activity. The marine electronic devices 405 may also include one or more sensors, such as temperature sensors, position sensors, current sensors, or the like configured to collect condition parameter data, e.g. sensor data and/or additional environmental data. In some example embodiments, the marine electronic devices may also include a user interface configured to receive user input indicative of condition parameters, such as date, time, weather, or the like. Example marine electronic devices 405 are described in further detail in FIG. 12 below.

The marine electronic device 405 may communicate the sonar data, location data, and/or condition parameter data via wired or wireless communication to a different marine electronic device 405 and/or a computing device 403 either directly or via the network 402. An example network 402 is described in further detail in FIG. 12 below.

The computing device 403 may receive the sonar data, location data, and/or condition parameters from one or more of the marine electronic devices 405. In an example embodiment, the computing device may include a marine electronic device 405, a smart phone, a tablet computer, a personal digital assistant (PDA), a laptop computer, a desk top computer, computing terminal, a kiosk, "augmented reality" visors/headgear, or the like. The computing device 403 may include a user interface 409 configured to receive user input indicative of request inputs, such as a desired location, current location, desired/current condition parameters, desired fish type, desired bait type, or the like. The computing device may include processing circuitry 407, such as a processor and memory. The processing circuitry is discussed in further detail in FIG. 12 below. The processing circuitry may be configured to filter the sonar data and the condition parameter data based on the request to generate a fishing activity report as discussed above.

FIG. 12 shows a block diagram of computing device, such as computing device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with an autopilot 450 or network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in the marine data system 400.

The marine electronic device 405 may include a processor 410, a memory 420, a user interface 435, a display 440, one or more sensors (e.g. position sensor 445, condition parameter sensor 447, etc.), a sonar transducer 448, and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data and generate a fishing activity report. For example, the processor 410 may be configured to receive sonar data and user input associated with a location to generate a fishing activity report for display to a user (e.g. on display 440/user interface 435). Additionally or alternatively, the processor 410 may be configured to generate and send route data including instructions to an autopilot 450 to operate a maneuvering system 455 to cause the vehicle to travel, such as to an optimal fishing location.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

The memory 420 may be configured to store instructions, computer program code, marine data, such as sonar data, chart data, location/position data, and other data associated with the navigation system in a non-transitory computer readable medium for use, such as by the processor.

The communication interface 430 may be configured to enable connection to external systems (e.g. an external network 402). In this manner, the marine electronic device 405 may retrieve stored data from a remote, external server via the external network 402 in addition to or as an alternative to the onboard memory 420.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 12 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405. Similarly, the autopilot 450 is depicted remote from the marine electronic device 405, but may be directly connected to the processor 410 within the marine electronic device.

The marine electronic device 405 may include one or more condition parameter sensors 447 configured to measure environmental condition parameters. The condition parameter sensors may include, for example, an air temperature sensor, a water temperature sensor, a current sensor, a light sensor, a wind sensor, a speed sensor, or the like. The environmental parameters may be associated with collected sonar data and/or user input, such as fishing logs, e.g. fishing data.

The sonar transducer 448 may be housed in a trolling motor housing attached to the watercraft or, in some cases, be castable. The sonar transducer 448 may be configured to gather sonar data, e.g. sonar returns, from the underwater environment relative to the watercraft. Accordingly, the processor 410 may be configured to receive the sonar data from the sonar transducer 448, process the sonar data to generate an image including a sonar image based on the gathered sonar data. In some embodiments, the marine electronic device 405 may be used to determine depth and bottom contours, detect fish, locate wreckage, etc. Sonar beams or pulses, from a sonar transducer 448, can be transmitted into the underwater environment. The sonar signals reflect off objects in the underwater environment (e.g. fish, structure, sea floor bottom, etc.) and return to the transducer assembly, which converts the sonar returns into sonar data that can be used to produce an image of the underwater environment.

The autopilot 450 may include processing circuitry, such as a processor and a memory, configured to operate the maneuvering system 455. The autopilot 450 may be configured to operate the maneuvering system automatically, e.g. without user interaction, causing a vehicle, such as a watercraft to travel along a route, such as to a specified fishing location. The autopilot 450 may generate instructions based on a vehicle position, the route or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vehicle.

Example Flowchart(s) and Operations

Embodiments of the present invention provide methods, apparatus and computer program products for generating fishing activity reports. Various examples of the operations performed in accordance with embodiments of the present invention will now be provided with reference to FIG. 13.

FIG. 13 illustrates a flowchart according to an example method for generating vehicle fishing activity report according to an example embodiment. The operations illustrated in and described with respect to FIG. 13 may, for example, be performed by, with the assistance of, and/or under the control of one or more of the processor 410, memory 420, communication interface 430, user interface 435, position sensor 445, condition parameter sensor 447, sonar transducer 448, display 440, autopilot 450 and/or maneuvering system 455. The method may include receiving a plurality of sets of sonar data from one or more marine electronic devices at operation 502, receiving a current location and at least one condition parameter value associated with each of the plurality of sonar data readings at operation 504, and receiving a request from a user to display a condition and location based fishing activity report at operation 506. The method may also include filtering the plurality of sets of sonar data based on the request to generate a fishing activity report at operation 508 and causing display of the fishing activity report on a screen at operation 510.

In some embodiments, the method may include additional, optional operations, and/or the operations described above may be modified or augmented. Some examples of modifications, optional operations, and augmentations are described below, as indicated by dashed lines, such as, determining one or more optimal fishing locations or conditions 512, causing an alert in response to one or more optimal fishing locations or conditions satisfying a correlation threshold at operation 514, and causing an indication of one or more of the optimal fishing locations to be displayed on the user interface at operation 516.

In an example embodiment, the method may also include receiving an indication of one or more current condition parameters at operation 518 and receiving an indication of a current location at operation 520. The current location or current condition parameters may be a portion of the request at operation 506 and used to filter the plurality of sets of sonar data and generate a fishing activity report at operation 508. Additionally or alternatively, the current location and/or current condition parameters may be used in the determination of optimal fishing locations and/or conditions at operation 512.

In some example embodiments, the method may additionally include receiving one or more fishing logs from a computing device associated with one or more of the plurality of sets of sonar data at operation 522 and associating the one or more fishing logs with the one or more of the plurality of sets of sonar data at operation 524. The request may include parameters and/or locations associated with the fishing logs at operation 506. The marine electronic device may filter the plurality of sets of sonar data based on the request and generate a fishing report including both portions of the plurality of sets of sonar data and fishing data from the fishing logs associated with the plurality of sets of sonar data.

In an example embodiment, the method may include determining a region of a body of water based on the location data at operation 526. The location data may be a portion of the request received at operation 506 and/or a current location received at operation 520. Filtering of the plurality of sets of data at operation 508 to generate the fishing activity report may be for the determined region of the body of water. The method may also include comparing the fishing activity report to a fish activity threshold at operation 528 and causing the display of the fishing activity report at operation 510 may include displaying one or more hot spot locations of the region of the body of water, such as overlaid on a nautical chart.

FIG. 13 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A marine data system comprising:
at least one marine electronic device comprising:
a sonar transducer configured to generate sonar data indicative of fish activity or a structure,
a location sensor configured to determine a current location associated with the sonar data,
a marine electronic device processor, and
a memory including computer program code configured to, with the marine electronic device processor, cause the marine electronic device to:
determine at least one condition parameter associated with the sonar data, wherein the at least one condition parameter is not the current location, and
transmit at least the sonar data, the current location associated with the sonar data, and the at least one condition parameter associated with the sonar data to a remote computing device; and
the computing device comprising:
a computing device processor, and
a memory including computer program code configured to, with the computing device processor, cause the computing device to:
receive a plurality of sets of sonar data, current locations associated with the plurality of sets of the sonar data, and condition parameters associated with the plurality of sets of the sonar data;
receive a request from a user to display a condition and location based fishing activity report, wherein the request indicates at least one location and at least one condition parameter associated with desired fishing activity;
filter the plurality of sets of sonar data based on the request to generate a fishing activity report, wherein the fishing activity report includes one or more portions of the plurality of sets of the sonar data that are associated with the indicated at least one location and the at least one condition parameter;
determine one or more optimal fishing condition parameters based on the fishing activity report, wherein the one or more optimal fishing condition parameters includes a bait type or lure type;
cause display of the fishing activity report on a screen such that the one or more portions of the plurality of sets of the sonar data are displayed in a report that also indicates the at least one location, the at least one condition parameter from the request, and the one or more optimal fishing condition parameters;
compare at least one current condition parameter to the one or more optimal fishing condition parameters to determine a correlation value between the at least one current condition parameter and the one or more optimal fishing condition parameters;
compare the correlation value to a predetermined correlation threshold; and
cause, in an instance in which the correlation value satisfies the predetermined correlation threshold, an alert such that a user is alerted to a situation in which the optimal fishing condition parameters are present based on the at least one current condition parameter.

2. The marine data system of claim 1, wherein the processor and memory are further configured to:
compare the fish activity report to a predetermined hot spot threshold, wherein the hot spot threshold is defined by a predetermined number of fish or plots indicated in a sonar image,
cause an alert in response to the at least a portion of the fishing activity report satisfying the hot spot threshold,
cause an indication of one or more locations in which the fishing activity report satisfies the predetermined hot spot threshold to be displayed on the user interface.

3. The marine data system of claim 1, wherein the marine electronic device further comprises:
a user interface configured to receive user input including an indication of fish caught or casts.

4. The marine data system of claim 1, wherein the processor and memory are further configured to:
cause at least a portion of the fishing activity report to be overlaid on a nautical chart based on the location input.

5. A computing device comprising a processor and a memory including computer program code configured to, with the processor, cause the computing device to:
receive a plurality of sets of sonar data, current locations associated with the plurality of sets of sonar data, and condition parameters associated with the plurality of sets of sonar data from one or more marine electronic devices, wherein the condition parameters are not the current locations and wherein each of the plurality of sets of sonar data is data indicative of fish activity or a structure;
receive a request from a user to display a condition and location based fishing activity report, wherein the request indicates at least one location and at least one condition parameter associated with desired fishing activity;
filter the plurality of sets of the sonar data based on the request to generate the fishing activity report, wherein the fishing activity report includes one or more portions of the plurality of sets of the sonar data that are associated with the indicated at least one location and the at least one condition parameter;
determine one or more optimal fishing condition parameters based on the fishing activity report, wherein the one or more optimal fishing condition parameters includes a bait type or lure type;
compare at least one current condition parameter to a corresponding optimal fishing condition parameter to determine a correlation value between the at least one current condition parameter and the corresponding optimal fishing condition parameter;
compare the correlation value to a predetermined correlation threshold; and
cause an alert in response to the correlation value satisfying the predetermined correlation threshold.

6. The computing device of claim 5, wherein the processor and memory are further configured to:
cause at least a portion of the fishing activity report to be overlaid on a nautical chart based on the location input.

7. The computing device of claim 5, wherein the processor and memory are further configured to:
compare the fishing activity report to a predetermined hot spot threshold, wherein the hot spot threshold is defined by a predetermined number of fish or plots indicated in a sonar image, wherein the alert is generated in response to at least a portion of the fishing activity report satisfying the hot spot threshold.

8. The computing device of claim 5, wherein the processor and memory are further configured to:
compare the fishing activity report to a predetermined hot spot threshold, wherein the hot spot threshold is defined by a predetermined number of fish or plots indicated in a sonar image,
cause an alert in response to the fishing activity report satisfying the hot spot threshold,
cause an indication of one or more locations in which the fishing activity reports satisfies the predetermined fish activity threshold to be displayed on the user interface.

9. The computing device of claim 5, wherein the fishing activity report comprises a fish activity density map.

10. The computing device of claim 5, wherein the fish activity comprises an average of the one or more portions of the plurality of sets of the sonar data or an aggregate of the one or more portions the plurality of sets of the sonar data.

11. The computing device of claim 5, wherein the fish activity report is further based on user input including at least a number of fish caught at a location.

12. The computing device of claim 11, wherein the user input further comprises a fish type or bait type associated with the number of fish caught at the location, wherein the request further comprises an indication of a desired fish type or bait type from the user interface, and wherein the fishing activity report is further based on the fish type or bait type associated with the number of fish caught at the location and the desired fish type or desired bait type.

13. The computing device of claim 5, wherein the processor and memory are further configured to:
determine a fishing area based on the requested at least one location, wherein determining the fishing activity report comprises determining the fishing activity report for at least a portion of the fishing area; and
compare the fishing activity report to a hot spot threshold, wherein causing the fish activity report to be displayed comprises displaying one or more areas in which the fish activity satisfies the hot spot threshold.

14. The computing device of claim 13, wherein each of the one or more areas is displayed such that the one or more areas are indicative of an amount in excess of the hot spot threshold, wherein at least one of the size, color, or pattern of the one or more areas varies with the amount in excess of the hot spot threshold.

15. The computing device of claim 5, wherein the at least one condition parameter includes at least one of a temperature or date, wherein the processor and the memory are further configured to receive an indication of a current temperature, temperature input, current date, or date input, and wherein the fishing activity report is further based on the temperature or date and the current temperature, temperature input, current date, or date input.

16. The computing device of claim 5 further including a user interface with the screen, wherein the user interface comprises a graphic user interface comprising:
at least one parameter selection region of the screen configured to display a plurality of parameters for user selection; and
at least one fishing activity report region of the screen configured to display a fish activity data graphic based on selected parameters.

17. The computing device of claim 16, wherein the fish activity data graphic is indicative of a number of fish catches per day or per man-hour and at least one sub-parameter.

18. A marine data system comprising:
at least one marine electronic device comprising:
a sonar transducer configured to generate sonar data indicative of fish activity or a structure,
a location sensor configured to determine a current location associated with the sonar data,
a marine electronic device processor, and
a memory including computer program code configured to, with the marine electronic device processor, cause the marine electronic device to:
determine at least one condition parameter associated with the sonar data, wherein the at least one condition parameter is not the current location, and
transmit at least the sonar data, the current location associated with the sonar data, and the at least one condition parameter associated with the sonar data to a remote device; and
a computing device comprising:
a computing device processor, and
a memory including computer program code configured to, with the computing device processor, cause the computing device to:
receive a plurality of sets of sonar data, current locations associated with the plurality of sets of the sonar data, and condition parameters associated with the plurality of sets of the sonar data;
receive a current location or one or more current condition parameters associated with the computing device;
filter the plurality of sets of sonar data based on the current location or the one or more current condition parameters to generate a fishing activity report, wherein the fishing activity report includes one or more optimal fishing locations;
determine one or more optimal fishing condition parameters based on the fishing activity report, wherein the one or more optimal fishing condition parameters includes a bait type or lure type;
compare the one or more current condition parameters to corresponding one or more optimal fishing condition parameters to determine a correlation value between the one or more current condition parameters and the corresponding one or more optimal fishing condition parameters;
compare the correlation value to a predetermined correlation threshold; and
cause, in an instance in which the correlation value satisfies the predetermined correlation threshold, an alert such that a user is alerted to a situation in which the one or more current condition parameters is similar to the optimal fishing condition parameters.

* * * * *

UNITED STATES PATENT AND TRADEMARK OFFICE
CERTIFICATE OF CORRECTION

PATENT NO. : 10,948,577 B2  
APPLICATION NO. : 15/246929  
DATED : March 16, 2021  
INVENTOR(S) : Kristopher C. Snyder Page 1 of 1

It is certified that error appears in the above-identified patent and that said Letters Patent is hereby corrected as shown below:

On the Title Page

In the Abstract, in Line 7, should read:
-- activity report. --

Instead of:
"activity s report."

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*